(12) United States Patent
Ryhorchuk et al.

(10) Patent No.: US 9,582,671 B2
(45) Date of Patent: Feb. 28, 2017

(54) SECURITY AND DATA PRIVACY FOR LIGHTING SENSORY NETWORKS

(71) Applicant: Sensity Systems Inc., Sunnyvale, CA (US)

(72) Inventors: Kent W. Ryhorchuk, Portola Valley, CA (US); Christopher David Sachs, Sunnyvale, CA (US)

(73) Assignee: Sensity Systems Inc., Sunnyvale, CA (US)

( * ) Notice: Subject to any disclaimer, the term of this patent is extended or adjusted under 35 U.S.C. 154(b) by 0 days.

(21) Appl. No.: 14/639,841

(22) Filed: Mar. 5, 2015

(65) Prior Publication Data
US 2015/0254463 A1  Sep. 10, 2015

Related U.S. Application Data

(60) Provisional application No. 61/948,817, filed on Mar. 6, 2014.

(51) Int. Cl.
*G06F 21/64* (2013.01)
*G06F 21/60* (2013.01)
(Continued)

(52) U.S. Cl.
CPC ............ *G06F 21/602* (2013.01); *G06F 21/31* (2013.01); *G06Q 10/00* (2013.01); *H04L 9/085* (2013.01);
(Continued)

(58) Field of Classification Search
CPC ....... H04L 9/085; H04L 9/006; H04L 9/0822; H04L 9/3263; H04L 9/3265; H04W 4/005
See application file for complete search history.

(56) References Cited

U.S. PATENT DOCUMENTS

| 4,384,288 A | 5/1983 | Walton |
| 5,161,107 A | 11/1992 | Mayeaux et al. |

(Continued)

FOREIGN PATENT DOCUMENTS

| CA | 2690148 A1 | 12/2008 |
| CN | 102110376 B | 11/2012 |

(Continued)

OTHER PUBLICATIONS

U.S. Appl. No. 14/224,300, Non Final Office Action mailed Jul. 8, 2014, 24 pgs.

(Continued)

*Primary Examiner* — Venkat Perungavoor
(74) *Attorney, Agent, or Firm* — Schwegman Lundberg & Woessner, P.A.

(57) ABSTRACT

In various example embodiments, a system and method are provided for protection customer data collected at sensor nodes within a networked system. A key recovery module determines the encrypted sensor data in a request was encrypted with a certified public key associated with a first customer key-pair. The first customer key-pair represents a recovered private key. The key recovery module determines the private key associated with the first customer key-pair is encrypted with the private key associated with a second customer key-pair. The private key associated with the first customer key-pair is decrypted by using the private key associated with the second customer key-pair. The encrypted sensor data in the request is decrypted using the decrypted private key associated with the first customer key-pair.

16 Claims, 10 Drawing Sheets

(51) Int. Cl.
*G06Q 10/00* (2012.01)
*H04L 9/32* (2006.01)
*H04L 9/08* (2006.01)
*H04L 29/06* (2006.01)
*G06F 21/31* (2013.01)
*H04L 9/30* (2006.01)

(52) U.S. Cl.
CPC .......... *H04L 9/0894* (2013.01); *H04L 9/3247* (2013.01); *H04L 9/3268* (2013.01); *H04L 63/0428* (2013.01); *G06Q 2220/00* (2013.01)

(56) References Cited

U.S. PATENT DOCUMENTS

| | | | |
|---|---|---|---|
| 5,161,607 A | 11/1992 | Chao | |
| 5,793,491 A | 8/1998 | Wangler et al. | |
| 6,118,230 A | 9/2000 | Fleischmann | |
| 6,364,253 B1 | 4/2002 | Cavanagh | |
| 6,608,453 B2 | 8/2003 | Morgan et al. | |
| 6,683,539 B2 | 1/2004 | Trajkovic et al. | |
| 6,696,945 B1 | 2/2004 | Venetianer et al. | |
| 6,961,313 B1 | 11/2005 | Gaspar | |
| 6,970,083 B2 | 11/2005 | Venetianer et al. | |
| 6,999,882 B2 | 2/2006 | Frie et al. | |
| 7,304,727 B2 | 12/2007 | Chien et al. | |
| 7,333,903 B2 | 2/2008 | Walters et al. | |
| 7,583,815 B2 | 9/2009 | Zhang et al. | |
| 7,613,324 B2 | 11/2009 | Venetianer et al. | |
| 7,613,590 B2 | 11/2009 | Brown | |
| 7,674,018 B2 | 3/2010 | Holder et al. | |
| 7,817,063 B2 | 10/2010 | Hawkins et al. | |
| 7,825,602 B2 | 11/2010 | Hu et al. | |
| 7,868,912 B2 | 1/2011 | Venetianer et al. | |
| 7,925,249 B2 | 4/2011 | Funk et al. | |
| 7,925,384 B2 | 4/2011 | Huizenga et al. | |
| 7,932,923 B2 | 4/2011 | Lipton et al. | |
| 7,983,685 B2 | 7/2011 | Silverstrim et al. | |
| 7,986,339 B2 | 7/2011 | Higgins | |
| 8,027,809 B2 | 9/2011 | Brown | |
| 8,049,592 B2 | 11/2011 | Wang et al. | |
| 8,073,554 B2 | 12/2011 | Vezza et al. | |
| 8,078,431 B2 | 12/2011 | Brown | |
| 8,095,340 B2 | 1/2012 | Brown | |
| 8,111,018 B2 | 2/2012 | You | |
| 8,147,267 B2 | 4/2012 | Oster | |
| 8,244,260 B2 | 8/2012 | Silverstrim et al. | |
| 8,285,986 B2 | 10/2012 | Shon et al. | |
| 8,295,491 B2* | 10/2012 | Armknecht | H04L 9/083 380/270 |
| 8,306,051 B2 | 11/2012 | Stocker et al. | |
| 8,334,901 B1 | 12/2012 | Ganick et al. | |
| 8,334,906 B2 | 12/2012 | Lipton et al. | |
| 8,379,857 B1* | 2/2013 | Zheng | H04L 63/062 380/255 |
| 8,436,542 B2 | 5/2013 | Middleton-white et al. | |
| 8,438,175 B2 | 5/2013 | Papke et al. | |
| 8,441,397 B2 | 5/2013 | Binzer et al. | |
| 8,461,963 B2 | 6/2013 | Ko et al. | |
| 8,464,182 B2 | 6/2013 | Blumenberg et al. | |
| 8,493,209 B2 | 7/2013 | Mohan et al. | |
| 8,510,550 B2 | 8/2013 | Westhoff et al. | |
| 8,514,082 B2 | 8/2013 | Cova et al. | |
| 8,522,029 B2 | 8/2013 | Agrawal et al. | |
| 8,531,134 B2 | 9/2013 | Chemel et al. | |
| 8,532,962 B2 | 9/2013 | Zhang et al. | |
| 8,533,491 B2 | 9/2013 | Klein | |
| 8,542,130 B2 | 9/2013 | Lavoie | |
| 8,558,889 B2 | 10/2013 | Martin et al. | |
| 8,560,357 B2 | 10/2013 | Sickenius | |
| 8,564,661 B2 | 10/2013 | Lipton et al. | |
| 8,575,861 B1 | 11/2013 | Gordin et al. | |
| 8,582,816 B2 | 11/2013 | Lee et al. | |
| 8,587,225 B2 | 11/2013 | Ashar et al. | |
| 8,590,011 B1 | 11/2013 | Legault | |
| 8,594,482 B2 | 11/2013 | Fan et al. | |
| 8,607,341 B2 | 12/2013 | Yoon et al. | |
| 8,619,079 B2 | 12/2013 | Peterson et al. | |
| 8,619,549 B2 | 12/2013 | Narayana et al. | |
| 8,635,049 B2 | 1/2014 | Kauffman et al. | |
| 8,732,031 B2 | 5/2014 | Martin et al. | |
| 8,880,199 B2 | 11/2014 | Wei et al. | |
| 8,994,276 B2 | 3/2015 | Recker et al. | |
| 9,374,870 B2 | 6/2016 | Cumpston et al. | |
| 2002/0195975 A1 | 12/2002 | Schanberger et al. | |
| 2003/0102979 A1 | 6/2003 | Jednacz et al. | |
| 2003/0222587 A1 | 12/2003 | Dowling, Jr. et al. | |
| 2004/0124338 A1 | 7/2004 | Cloutier et al. | |
| 2005/0285547 A1 | 12/2005 | Piepgras et al. | |
| 2007/0143608 A1* | 6/2007 | Zeng | H04L 9/0836 713/168 |
| 2007/0223706 A1* | 9/2007 | Gantman | G06F 21/34 380/286 |
| 2007/0234036 A1 | 10/2007 | Tan et al. | |
| 2007/0258585 A1 | 11/2007 | Sandhu et al. | |
| 2007/0294393 A1 | 12/2007 | Smith et al. | |
| 2008/0215391 A1 | 9/2008 | Dowling et al. | |
| 2009/0026966 A1 | 1/2009 | Budde et al. | |
| 2009/0066540 A1 | 3/2009 | Marinakis et al. | |
| 2009/0218951 A1 | 9/2009 | Weaver | |
| 2009/0262189 A1 | 10/2009 | Marman | |
| 2009/0278479 A1 | 11/2009 | Platner et al. | |
| 2009/0299527 A1 | 12/2009 | Huizenga et al. | |
| 2009/0307255 A1 | 12/2009 | Park | |
| 2010/0001652 A1 | 1/2010 | Damsleth | |
| 2010/0037055 A1* | 2/2010 | Fazio | H04L 9/3218 713/171 |
| 2010/0204847 A1 | 8/2010 | Leete, III et al. | |
| 2010/0228601 A1 | 9/2010 | Vaswani et al. | |
| 2010/0235588 A1* | 9/2010 | Maeda | H04L 9/085 711/147 |
| 2011/0002324 A1 | 1/2011 | Falck et al. | |
| 2011/0066297 A1 | 3/2011 | Saberi et al. | |
| 2011/0103583 A1* | 5/2011 | Yoon | H04L 9/302 380/255 |
| 2011/0133655 A1 | 6/2011 | Recker et al. | |
| 2011/0158410 A1 | 6/2011 | Falk et al. | |
| 2011/0197061 A1* | 8/2011 | Chou | H04L 9/3265 713/156 |
| 2011/0199004 A1 | 8/2011 | Henig et al. | |
| 2011/0309756 A1 | 12/2011 | Chao | |
| 2012/0002406 A1 | 1/2012 | Leadford et al. | |
| 2012/0008787 A1 | 1/2012 | Wan et al. | |
| 2012/0036362 A1 | 2/2012 | Agrawal et al. | |
| 2012/0038281 A1 | 2/2012 | Verfuerth | |
| 2012/0040606 A1 | 2/2012 | Verfuerth | |
| 2012/0043889 A1 | 2/2012 | Recker et al. | |
| 2012/0062123 A1 | 3/2012 | Jarrell et al. | |
| 2012/0068608 A1 | 3/2012 | Covaro et al. | |
| 2012/0086561 A1 | 4/2012 | Ilyes et al. | |
| 2012/0130544 A1 | 5/2012 | Mohan et al. | |
| 2012/0130774 A1 | 5/2012 | Ziv et al. | |
| 2012/0143357 A1 | 6/2012 | Chemel et al. | |
| 2012/0146518 A1 | 6/2012 | Keating et al. | |
| 2012/0191770 A1 | 7/2012 | Perlmutter et al. | |
| 2012/0262093 A1 | 10/2012 | Recker et al. | |
| 2012/0310984 A1 | 12/2012 | Branson et al. | |
| 2012/0321086 A1 | 12/2012 | D'souza et al. | |
| 2013/0005255 A1* | 1/2013 | Pering | H04W 4/005 455/41.2 |
| 2013/0010251 A1 | 1/2013 | Croft et al. | |
| 2013/0013091 A1 | 1/2013 | Cavalcanti et al. | |
| 2013/0073192 A1 | 3/2013 | Hota et al. | |
| 2013/0088168 A1 | 4/2013 | Mohan et al. | |
| 2013/0107041 A1 | 5/2013 | Norem et al. | |
| 2013/0134886 A1 | 5/2013 | Golding et al. | |
| 2013/0144564 A1 | 6/2013 | Devaul et al. | |
| 2013/0158952 A1 | 6/2013 | Liebel et al. | |
| 2013/0159454 A1 | 6/2013 | Hunter et al. | |
| 2013/0191632 A1* | 7/2013 | Spector | H04L 9/083 713/155 |

(56) References Cited

U.S. PATENT DOCUMENTS

| | | |
|---|---|---|
| 2013/0211613 A1 | 8/2013 | Praske et al. |
| 2013/0221203 A1 | 8/2013 | Barrilleaux |
| 2013/0227569 A1 | 8/2013 | Kohli et al. |
| 2013/0229804 A1 | 9/2013 | Holder et al. |
| 2013/0265563 A1 | 10/2013 | Vogt et al. |
| 2013/0297212 A1 | 11/2013 | Ramer et al. |
| 2013/0342355 A1 | 12/2013 | Lund et al. |
| 2013/0346229 A1 | 12/2013 | Martin et al. |
| 2014/0028199 A1 | 1/2014 | Chemel |
| 2014/0084795 A1 | 3/2014 | Cumpston et al. |
| 2014/0136838 A1* | 5/2014 | Mossbarger ............ H04L 9/006 713/156 |
| 2014/0201541 A1* | 7/2014 | Paul .................... G06F 21/6245 713/193 |
| 2014/0359272 A1* | 12/2014 | Hiltunen .................. G09C 1/00 713/150 |

FOREIGN PATENT DOCUMENTS

| | | |
|---|---|---|
| CN | 102867386 A | 1/2013 |
| CN | 20293979 U | 5/2013 |
| CN | 103687200 A | 3/2014 |
| EP | 1658579 A1 | 5/2006 |
| EP | 2581888 A1 | 4/2013 |
| EP | 2660625 A1 | 11/2013 |
| EP | 2709428 A2 | 3/2014 |
| JP | 2014064274 A | 4/2014 |
| KR | 1020070044243 A | 4/2007 |
| KR | 100760535 B1 | 9/2007 |
| KR | 100784836 B1 | 12/2007 |
| KR | 20100136186 A | 12/2010 |
| KR | 20110017037 A | 2/2011 |
| KR | 20110055807 A | 5/2011 |
| KR | 20150089983 A | 8/2015 |
| WO | WO-03055734 A1 | 7/2003 |
| WO | WO-2008008505 A2 | 1/2008 |
| WO | WO-2008085815 A1 | 7/2008 |
| WO | WO-2009076182 A1 | 6/2009 |
| WO | WO-2011041903 A1 | 4/2011 |
| WO | WO-2011053969 A2 | 5/2011 |
| WO | WO-2011055261 A1 | 5/2011 |
| WO | WO-2011121470 A1 | 10/2011 |
| WO | WO-2011132013 A1 | 10/2011 |
| WO | WO-2012042432 A1 | 4/2012 |
| WO | WO-2012092150 A2 | 7/2012 |
| WO | WO-2012140152 A1 | 10/2012 |
| WO | WO-2013131189 A1 | 9/2013 |
| WO | WO-2013165777 A1 | 11/2013 |
| WO | WO-2015134929 A2 | 9/2015 |
| WO | WO-2015134929 A3 | 9/2015 |

OTHER PUBLICATIONS

International Application Serial No. PCT/US2013/037968, International Search Report mailed Jul. 2, 2013, 2 pgs.
International Application Serial No. PCT/US2013/045407, International Search Report mailed Sep. 23, 2013, 8 pgs.
International Application Serial No. PCT/US2014/031723, International Search Report mailed Jul. 7, 2014, 3 pgs.
International Application Serial No. PCT/US2015/019286, International Search Report mailed Jun. 11, 2015, 2 pgs.
International Application Serial No. PCT/US2015/019286, Written Opinion mailed Jun. 11, 2015, 8 pgs.
International Application Serial No. PCT/US2015/019296, International Search Report mailed Jun. 1, 2015, 3 pgs.
International Application Serial No. PCT/US2015/019296, Written Opinion mailed Jun. 1, 2015, 8 pgs.
Korean Application Serial No. 2013-0109844, Office Action mailed Jul. 24, 2014, W/ English Translation, 12 pgs.
Korean Application Serial No. 2013-109844, Final Rejection After Reexamination mailed Apr. 14, 2015, W/ English Translation, 6 pgs.
Korean Application Serial No. 2013109844, Office Action mailed Feb. 26, 2015, 6 pgs.
Munoz, D, et al., , Position Location Techniques and Applications, Academic Press, (2009), 297 pgs.
Xu, J, et al., "Distance Measurement Model Based on RSSI in WSN", Wireless Sensor Network, (2010), 606-611.
U.S. Appl. No. 14/024,561, Non Final Office Action mailed Jul. 22, 2015, 12 pgs.
U.S. Appl. No. 14/024,561, Notice of Allowance mailed Feb. 19, 2016, 5 pgs.
U.S. Appl. No. 14/024,561, Notice of Allowance mailed Nov. 25, 2015, 5 pgs.
U.S. Appl. No. 14/024,561, Response filed Oct. 21, 2015 to Non Final Office Action mailed Jul. 22, 2015, 13 pgs.
European Application Serial No. 13184124.9, Communication Pursuant to EPC Rule 69 mailed Jul. 13, 2015, 2 pgs.
European Application Serial No. 13184124.9, Extended European Search Report mailed Jun. 5, 2015, 9 pgs.
European Application Serial No. 13184124.9, Response filed Jan. 8, 2016 to Extended European Search Report mailed Jun. 5, 2015, 22 pgs.
International Application Serial No. PCT/US2015/019286, International Preliminary Report on Patentability mailed Sep. 6, 2016, 9 pgs.
Korean Application Serial No. 2013-0109844, Response filed Oct. 14, 2014 to Office Action mailed Jul. 24, 2014, W/ English Claims.
Korean Application Serial No. 2013109844, Response filed Mar. 30, 2015 to Office Action mailed Feb. 26, 2015, W/ English Claims, 20 pgs.

* cited by examiner

SECURITY AND DATA PRIVACY FOR LIGHTING SENSORY NETWORKS

RELATED APPLICATIONS

This application claims priority benefits of U.S. Provisional Application Ser. No. 61/948,817, filed Mar. 6, 2014, which is incorporated in its entirety by reference. This application is related to U.S. Non-Provisional patent application Ser. No. 14/024,561, entitled "Networked Lighting Infrastructure for Sensing Applications," filed Sep. 11, 2013, and its related U.S. Provisional Application No. 61/699,968, of the same name, filed Sep. 12, 2012.

TECHNICAL FIELD

Embodiments of the present disclosure relate generally to security and data privacy in a networked environment, and more particularly, but not by way of limitation, to protecting customer data collected by sensor networks.

BACKGROUND

Today, sensor networks are being used in a wide range of application areas. For example, data collected by sensor networks may be used for environmental monitoring, security and surveillance, logistics and transportation, control and automation, and traffic monitoring. Security and privacy is one of the major concerns when the sensor networks collect sensor data involving human participants. Adequate security measures may be implemented in a system that collects, stores and processes the sensor data to preserve the privacy of the human participants and to prevent unauthorized access to the sensor data collected by the sensor network.

BRIEF DESCRIPTION OF THE DRAWINGS

The various embodiments are illustrated by way of example, and not by way of limitation, in the figures of the accompanying drawings in which.

Figure 1:
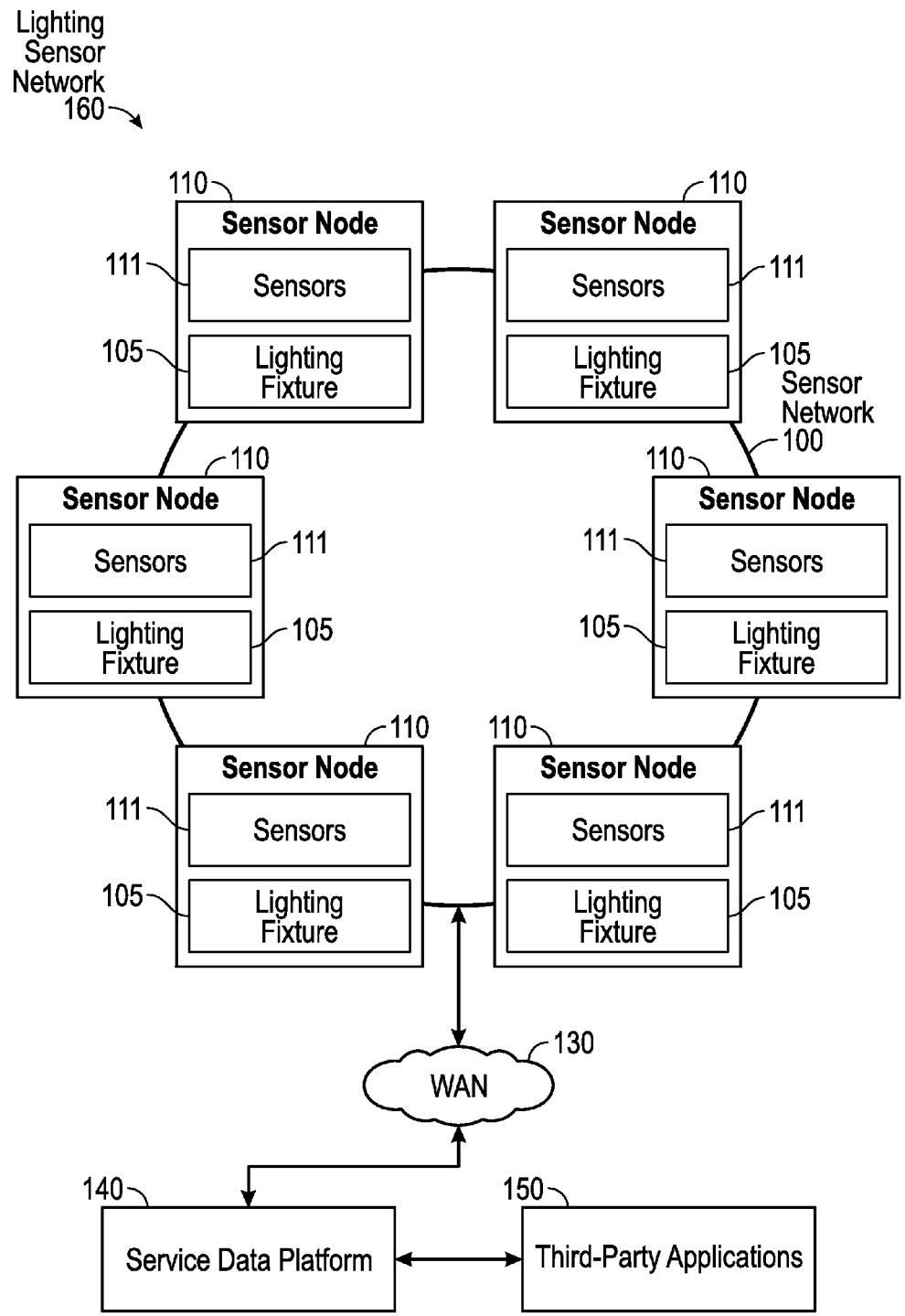
FIG. 1 is a diagram of a lighting sensor network suitable for use in various embodiments.

The headings provided herein are merely for convenience and do not necessarily affect the scope or meaning of the terms used.

DETAILED DESCRIPTION

The description that follows includes systems, methods, techniques, instruction sequences, and computing machine program products that embody illustrative embodiments of the present invention. In the following description, for purposes of explanation, numerous specific details are set forth in order to provide an understanding of various embodiments of the inventive subject matter. As used herein, the term "or" may be construed in either an inclusive or exclusive sense. It will be evident, however, to those skilled in the art that embodiments of the inventive subject matter may be practiced without these specific details. In general, well-known instruction instances, protocols, structures, and techniques have not been shown in detail. Example embodiments described herein provide systems and methods for security and data privacy for sensor networks in communication with a service data platform.

In various embodiments, public key cryptography implemented with a private key sharing scheme, may also be used to secure customer data from unauthorized access by third parties. The customer data may represent sensor data collected by sensor nodes within a sensor network. Examples of sensor data include motion detection data, ambient light sensor data, audio data, image data, video data, and vibration data. The customer data may contain sensitive identification information that requires protection to maintain the privacy of individuals represented by the customer data. The sensitive identification information may include personally identifiable information and customer identifiable information. Systems having access to sensitive identification information may be required to conform to various data privacy laws and regulations. A company or entity that owns or manages such a system may implement privacy guidelines to conform to data privacy laws, regulations, and best practices.

For example, a data privacy guideline may include the following provisions: data privacy is managed end-to-end; data privacy is supported during data collection, storage, and display; private data includes personally identifiable information and customer identifiable information; audio related sensing complies with federal wiretapping laws; all data accessed is password protected; data is only stored when required; personally identifiable information and customer identifiable information is transmitted when the relevant privacy guidelines are met, transmitted personally identifiable information and the customer identifiable information is encrypted; and the light infrastructure owners are required to post appropriate signs and get explicit written consent when required from individuals and entities. In some embodiments, the privacy guidelines for ambient data are based on prevailing laws and regulations and are developed to benefit end-users of the applications and services while protecting the privacy of individuals. Various guidelines may evolve based on the laws and user preferences as applications and services are developed and deployed.

In some embodiments, sensor nodes within lighting sensor networks may be configured to obtain various sensor data, such as video and audio data. For example, video camera sensors coupled to or residing within sensor nodes within a parking garage or parking lot may capture video and audio data of cars moving about. The obtained sensor data may often contain identifying data of persons (also referred to as sensitive identification information) within the infrastructures, such as motorists driving their cars within parking decks that include sensor nodes. For example, video data may include faces or likenesses of people, license plate numbers, or other distinguishing information about their respective automobiles. The owners of lighting sensor networks who are collecting raw sensor data at the sensor nodes may have legal obligations or other obligations to protect the privacy of persons whose identity may be potentially discovered by accessing the sensor data collected or recorded by the sensor nodes within a lighting sensor network. Some examples of sensitive identification information that may require additional privacy measures may include face identification, media access control (MAC) addresses on mobile phones, and license plates of cars. To protect the privacy of such persons, whose identity may be discovered by accessing the sensor data collected at the sensor nodes, public key cryptography may be used to protect customer data from unwanted sharing or access within a networked environment. The public key cryptography may be implemented using a public key infrastructure (PKI) to create digital certificates which certifies public keys with digital signatures.

The networked environment may include a lighting sensor network that includes a sensor network in communication with a server system representing a sensor data storage and management platform (also referred to as a service data platform) via a network (e.g., a wide area network (WAN)). This framework for collecting and processing sensor data supports end-to-end security and may be used to implement various privacy guidelines. The sensor network may be coupled to a lighting infrastructure (or other infrastructure) that is capable of providing the sensor nodes within the sensor network with mechanical support for mounting the sensor nodes, and additional power and networking capabilities to the sensor nodes. In example embodiments, some or all of the sensor nodes may be attached, directly or indirectly, to lighting fixtures within the lighting infrastructure.

Public key cryptography may be used to reduce or minimize security problems and threats by sending encrypted sensor data over the Internet or other networks and storing the sensor data in an encrypted form at the service data platform. Public key cryptography may also be used to allow or limit access to the sensor data (which may contain sensitive identification information) to only those parties who are authorized to have access to such data. In various embodiments, public key cryptography may be used by the lighting sensor network to protect the customer data collected at the sensor nodes. For example, the sensor data collected at the sensor nodes may be encrypted, using a customer public key, at the sensor nodes. The encrypted sensor data is transported to the service data platform and stored as encrypted sensor data until the customer decides to access the sensor data. The sensor data is decrypted using a customer private key sharing scheme in various embodiments. The public key cryptography allows the customer to manage and control the private key, and therefore limit access to its sensor data to only authorized parties.

In example embodiments, to protect the privacy of such persons represented within the sensor data and recordings by sensor nodes of the lighting sensor network, computing devices associated with the lighting sensor network may generate data (e.g., certificates, shares, keys, etc.) that only in combination may decrypt encrypted sensor data obtained by sensor nodes. In various embodiments, three types of keys and associated certificates are used. The three types of keys and associated certificates may be referred as device, server and customer keys and certificates. The device keys and device certificates are associated with the lighting nodes (and possibly other devices within the lighting network). The server keys and server certificates are associated with the service data platform which represents a server system having multiple servers. The customer keys and customer certificates are associated with customers. The customers may be customers of the service data platform or service provider who may be the owners of the lighting network. The customers may also be customers of the owners of the lighting network. The lighting sensor network may rely on these three types of keys and certificates. The number of each of the types of keys and certificates depends on the number of devices within the lighting sensor network that is participating or implementing the public key cryptography scheme described in the various embodiments. The various keys, certificates and shares, associated with the various devices (e.g., devices (i.e., sensor nodes), servers (i.e., service data platform), and customer devices) will be discussed in more detail with FIGS. 3B-3D.

In some embodiments, the customer private key may be split into three shares: a customer share, a server share, and a third-party share (e.g., trusted agency, escrow company) such that sensor data may only be decrypted using no less than two of the three shares. By using a private key sharing scheme, outside parties hoping to gain access to encrypted data recorded by sensor nodes may not be able to decrypt the data and thus reveal sensitive identity information without the permission or authorization of customers (or owners of the lighting sensor network or sensor nodes) and the designated number of shares from the private key. In various embodiments, customers may choose to provide the service data platform with an encrypted local share of their customer share in order to facilitate access to the encrypted sensor data stored by the service data platform by the customer upon their request. The combination of the server share the encrypted local share may be used to decrypt the encrypted sensor data. The encrypted local share may be password protected.

In various embodiments, customers may be enabled to access the encrypted sensor data obtained by sensor nodes via a web interface using the customer share (or encrypted local share of the customer share) of the private key.

The various embodiments provide methods, devices, systems, and non-transitory process-readable storage media for security and data privacy utilized within a lighting sensor network. Such networks are described within U.S. Provisional Application No. 61/948,817, filed Mar. 6, 2014 entitled "Security and Data Privacy for Lighting Sensory Network," the contents of which are incorporated by reference herewith in its entirety, and U.S. Non-Provisional patent application Ser. No. 14/024,561, entitled "Networked Lighting Infrastructure for Sensing Applications," filed Sep. 11, 2013 and its related U.S. Provisional Application No. 61/699,968, of the same title, filed Sep. 12, 2012.

The NetSense lighting sensor network platform, developed by Sensity Systems Inc. of Sunnyvale Calif., provides an example of a lighting sensor network that may be used to implement various embodiments described. The NetSense framework enables deployment of a variety of sensors using a lighting infrastructure that allows applications to securely access sensor data information, which may represent sensitive identification information. NetSense has been architected to support the end-to-end data security and evolving set of privacy guidelines. The key components of NetSense includes end-point sensor data collection devices (e.g., sensor nodes), a server platform that processes and enables applications to securely access the sensor data (e.g., service data platform) and a user interface that displays the sensor data.

To ensure data security within the NetSense platform, data may be encrypted for storage or before transmission. This ensures that even if the access to data is compromised, encryption will make the data unusable. In various embodiments, device level data (e.g., data at the sensor nodes) may be encrypted using public key cryptography.

FIG. 1 illustrates an implementation of a lighting sensor network 160 suitable for use in various embodiments. The lighting sensor network 160 enables deployment of a variety of sensors 111 using a lighting infrastructure and allows the sensor data to be securely transported to the service data platform 140 for secure storage and processing at the request of customers.

FIG. 1 shows the various components of the lighting sensor network 160. The lighting sensor network 160 represents a lighting infrastructure integrated with a sensor network 100 that is networked with a service data platform 140. The sensor nodes 100 include one or more sensors 111. The lighting infrastructure includes the sensor nodes 100, attached directly or indirectly to lighting fixtures within the lighting infrastructure. The sensor nodes 100, alone or in combination with the lighting infrastructure, may form the sensor network 100.

The sensor network 100 includes multiple spatially distributed sensor nodes 100 used to monitor physical and environmental conditions, such as temperature, sound, pressure, light, traffic (vehicles and people), and vibrations. The sensor nodes 100 may include several components, for example, multiple sensors, a radio transceiver with an internal antenna, a microcontroller, an electronic circuit for interfacing with sensors and a power supply. The sensor nodes 100 may include other networking interfaces. The controller includes memory for storing the various certificates, keys, and shares locally at the sensor nodes 100. For example, the Customer Certificate 1100, the Server Root Certificate 2000, the Device Certificate 3100, and the Device Private Key 3201, may be stored locally at the sensor nodes 100a in the example embodiment shown in FIG. 3B.

The sensor network 100 usually monitors an area such as a customer site. For example, the sensor nodes 100 may be attached to lighting fixtures 105 located at a customer site representing a lighting infrastructure. The lighting infrastructure (or other types of infrastructures) may be capable of providing power to the sensor nodes and mechanical or physical support for the sensor nodes. The infrastructure may also provide additional networking communication interfaces for the sensor network 100. The sensor nodes 100 are deployed within the site to monitor various conditions, events, or phenomenon that provides insights to users of the lighting sensor network 160. In alternative embodiments, only some of the lighting fixtures 105 within a lighting infrastructure are attached, directly or indirectly, to sensor nodes 100.

The sensor nodes 100 communicate over a network, such as a wide area network (WAN) 130 with the service data platform 140, which may represent one or more application servers residing in a cloud computing environment. In many applications, the sensor network 100 communicates with a local area network (LAN) or wide area network (WAN) through a gateway. For example, the gateway acts as a bridge between the WAN 130 and the other network (e.g., LAN, which is not shown). The sensor data collected at the sensor nodes 100 in the sensor network 100 may be securely transported to a remote server system (represented by the service data platform 140) for storage and processing. This enables data to be stored and processed by devices with more resources, for example, in a remotely located server system residing in a cloud computing environment.

In various embodiments, the service data platform 140 may be owned and operated by an entity referred to as a service provider. The owner of the lighting infrastructure may be referred to as a customer of the service provider. In some examples, the customer of the service provider may allow third parties to access to the sensor data collected at the sensor nodes 100. As mentioned above, the sensor data collected at the sensor nodes 100 may include sensitive identification information requiring appropriate security measures to be implemented by the lighting sensor network 160 to maintain the confidentiality and privacy of the sensor data, either raw sensor data, event sensor data, or processed sensor data.

As described above, public-key cryptography using key-pairs may be used by the lighting sensor network 160 to ensure there is no unauthorized access to the sensor data and the data is securely transported. Sensor data collected by the sensor nodes 100 may be encrypted by the sensor nodes 100 and then securely transported over the WAN 130 to be stored by the service data platform 140. Secure connections between the sensor nodes 100 and the service data platform 140 may be established using the various digital certificates and private keys issued to the sensor nodes, the servers, and the customer devices.

The sensor data stored by the service data platform 140 may be stored as encrypted sensor data until an authorized user requests access to the encrypted sensor data. Depending on the request from the authorized user to access the encrypted sensor data, the encrypted sensor data may be decrypted by the service data platform 140 in accordance with a private key sharing scheme or transported from the service data platform 140 to be decrypted by another system or offline from the service data platform 140. The private key sharing scheme used for decrypting the encrypted sensor data will be described in further detail below.

The service data platform 140 also provides both programmatic access thru API servers and web access thru web servers to data stored in the service data platform 140. Data may be stored in the service data platform 140 in one more databases, accessed through a database server. For example, the service data platform 140 may provide application programming interfaces (APIs) for third party applications to access sensor data stored in the service data platform 140. In another example, the service data platform 140 may also provide access to the sensor data via web servers.

The service data platform 140 may represent a platform for managing sensor data that includes database services for customers. Developers of third party application 150 may access the sensor data stored in the database and build their own applications utilizing the sensor data. Other online data services may also be provided by the service data platform 140, for example, analyzing and processing the sensor data which are accessible to authorized users of the service data platform 140. The service data platform 140 may include APIs and interfaces for third party application developers, a middleware containing the business logic needed for managing and processing the sensor data, a storage model suitable for the efficient storage and retrieval of large volumes of the sensor data, and appropriate security measures that are available to customers for protecting unauthorized access to their sensor data.

Figure 2:
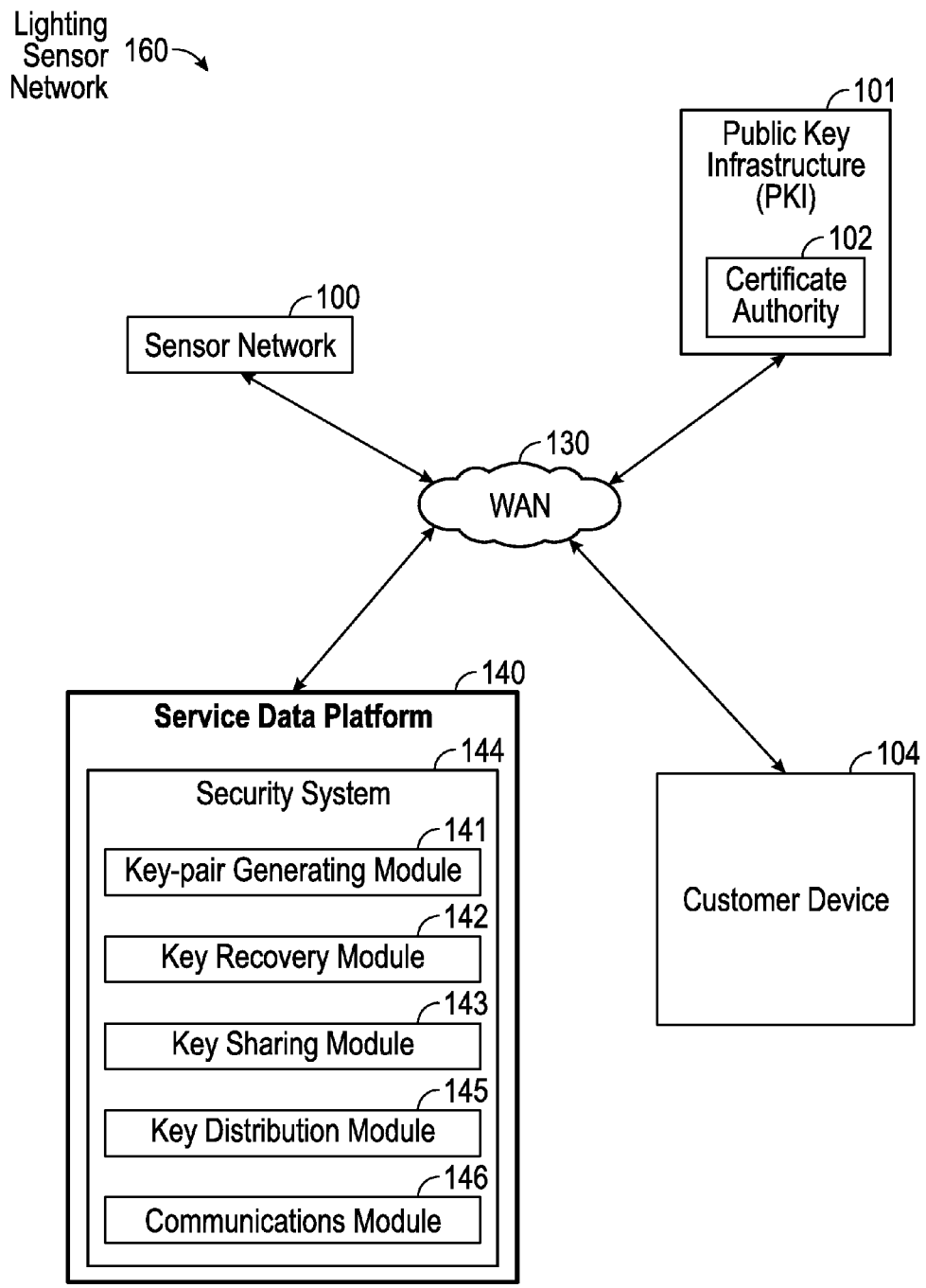
FIG. 2 illustrates a block diagram of a lighting sensor network in communication with a public key infrastructure (PKI) and a customer device according to example embodiments.

FIG. 2 illustrates a block diagram of a lighting sensor network 160 in communication with a public key infrastructure (PKI) 101 and a customer device 104 according to example embodiments. The lighting sensor network 160 includes a sensor network 100 and a service data platform 140. The service data platform 140 includes a security system 144 that may be used in various embodiments to implement the public key cryptography. The security system 144 includes a key pair generating module 141, a key recovery module 142, a key sharing module 143, a key distribution module 145, and a communications module 146.

The communications module 146 may be used by the service data platform 140 to communicate with the PKI 101, the certificate authority 102, the sensor network 100, the customer device 104, and the trusted third party device (not shown) via the WAN 130.

In example embodiments, the key distribution module 145, alone or in combination with the communication module 146, may be used to distribute various keys, certificates, and shares to the various devices within the lighting sensor network 160 or devices in communication with the lighting sensor network 160 (e.g., the customer device 104 or the trusted third party device (not shown)).

The key sharing module 143 is described below in conjunction with FIGS. 4-6. In various embodiments, the key sharing module 143 may be used to create the shares of the private key and also to reconstruct the private key using a subset of the shares required to implement the private key sharing scheme. The key recovery module 143 is described below in conjunction with FIG. 6.

The key-pair generating module 141 provides functionality to generate a key-pair using various public key cryptography algorithms. The PKI 101 is used to create the digital certificates in example embodiments. In some embodiments, after a key-pair is generated by the key-pair generating module 141, the communications module 146 of the service data platform 140 sends the public key portion of a key-pair to the PKI 101 to be certified with the digital signature of the PKI 101. The service data platform 140 keeps the private keys (used to decrypt data) secret and does not send it to the PKI 101. In various embodiments, the certificate authority 102 stores the root private keys for the devices, servers, and customers. The root private keys are difficult to revoke and they are kept very secure by the service data platform 140.

The PKI 101 creates a root certificate and other associated certificates for the various computing devices within the networked environment. For the example, the PKI 101 may create a customer root certificate and one or more customer certificates associated with a customer key-pair; a server root certificate and one or more server certificates associated with a server key-pair; and a device root certificate and one or more device certificates associated with a device key-pair.

Sensitive identification information (e.g., sensor data collected at the sensor nodes 100) may be exchanged over the Internet by relying on the PKI 101 for security. The PKI 101 may include hardware and software that may be used to implement policies and standards related to keys and digital certificates. The PKI 100 may include the following components:

- a trusted party, also referred to as a certificate authority, who acts as the root of trust and provides services that authenticate the identity of individuals, computers and other entities;
- a registration authority, also referred to as a subordinate certificate authority, is certified by a root certificate authority to issue digital certificates for specific uses permitted by the root;
- a certificate database for storing certificate requests; and
- a certificate store, which may reside on a local computer as a place to store issued certificates and private keys.

In some embodiments, the PKI 101 may be a private PKI owned and operated by the service data provider 140.

In alternative embodiments, the key-pair may be generated by a customer and who then obtains the certificates from the PKI 101 before distributing the various digital certificates and keys to the various computing devices within a networked environment.

A root certificate may be the base to issue multiple intermediate certificates. A root certificate is part of a PKI scheme. The root certificate may be based on the ITU-T X. 509 standard for public key infrastructure (PKI) and Privilege Management Infrastructure (PMI), which often includes a digital signature from a certificate authority. The digital certificates are verified using a chain of trust. The trust anchor for the digital certificate is the root certificate authority.

Figure 3A:
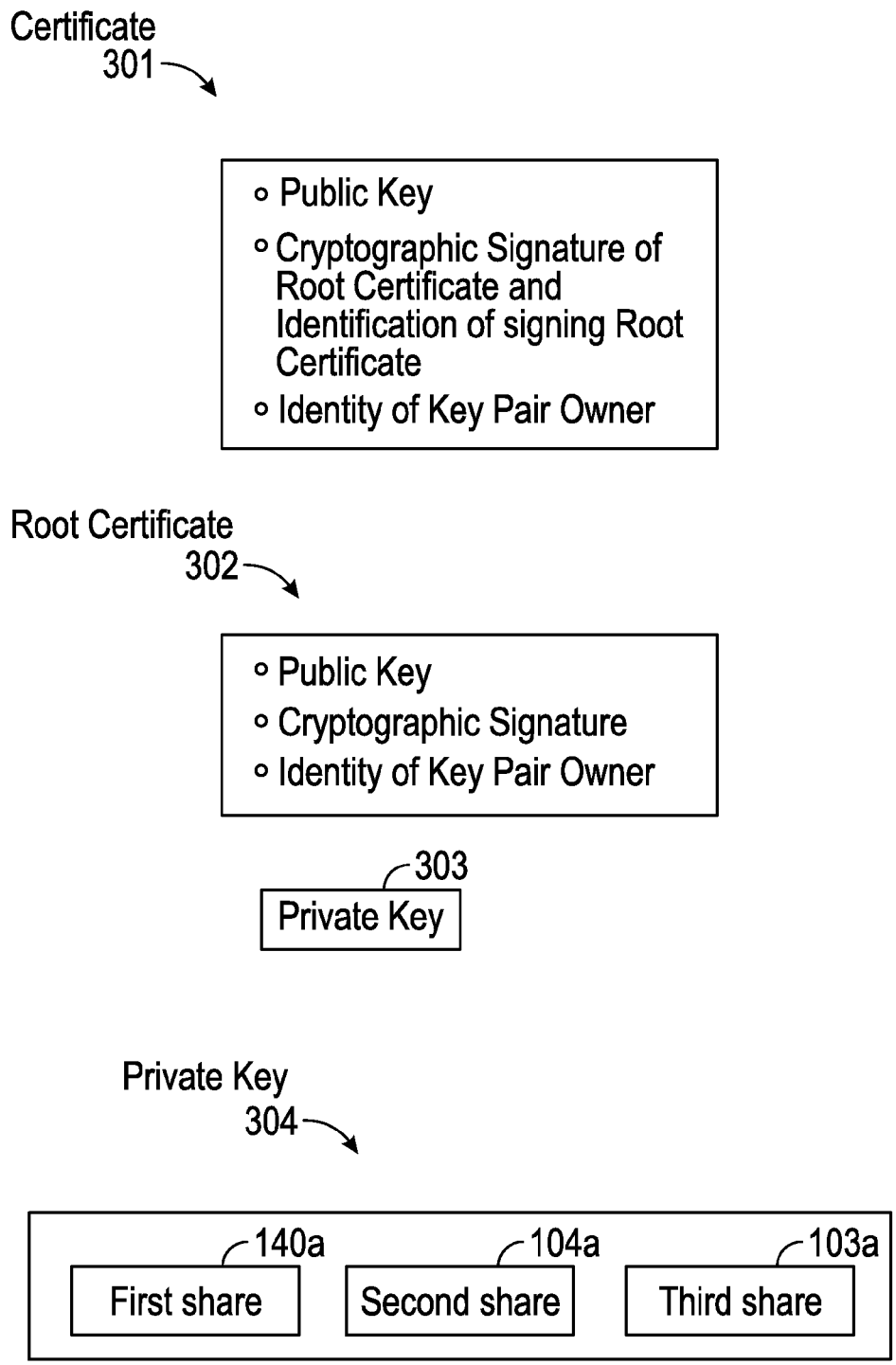
FIG. 3A illustrates various examples of certificates and private keys used to implement security within a lighting sensor network, according to example embodiments.

FIG. 3A illustrates an example of a certificate 301 and a root certificate 302. The information included within the certificates 301 and 302 include the public key information, a cryptographic signature of the certificate authority 102, identification information of the key-pair owner. The certificate 301 includes information about the root certificate 302 that was used to sign that particular certificate 302, in addition to the cryptographic signature of the root certificate 302. The certificate authority 102 issues a digital certificate to entities and individuals after verifying their identity. Also shown in FIG. 3A is a private key 303 and a private key 304 that uses a private sharing scheme. The private key 304 is divided into a first share 140a, a second share 104a, and a third share 103a.

Figure 3B:
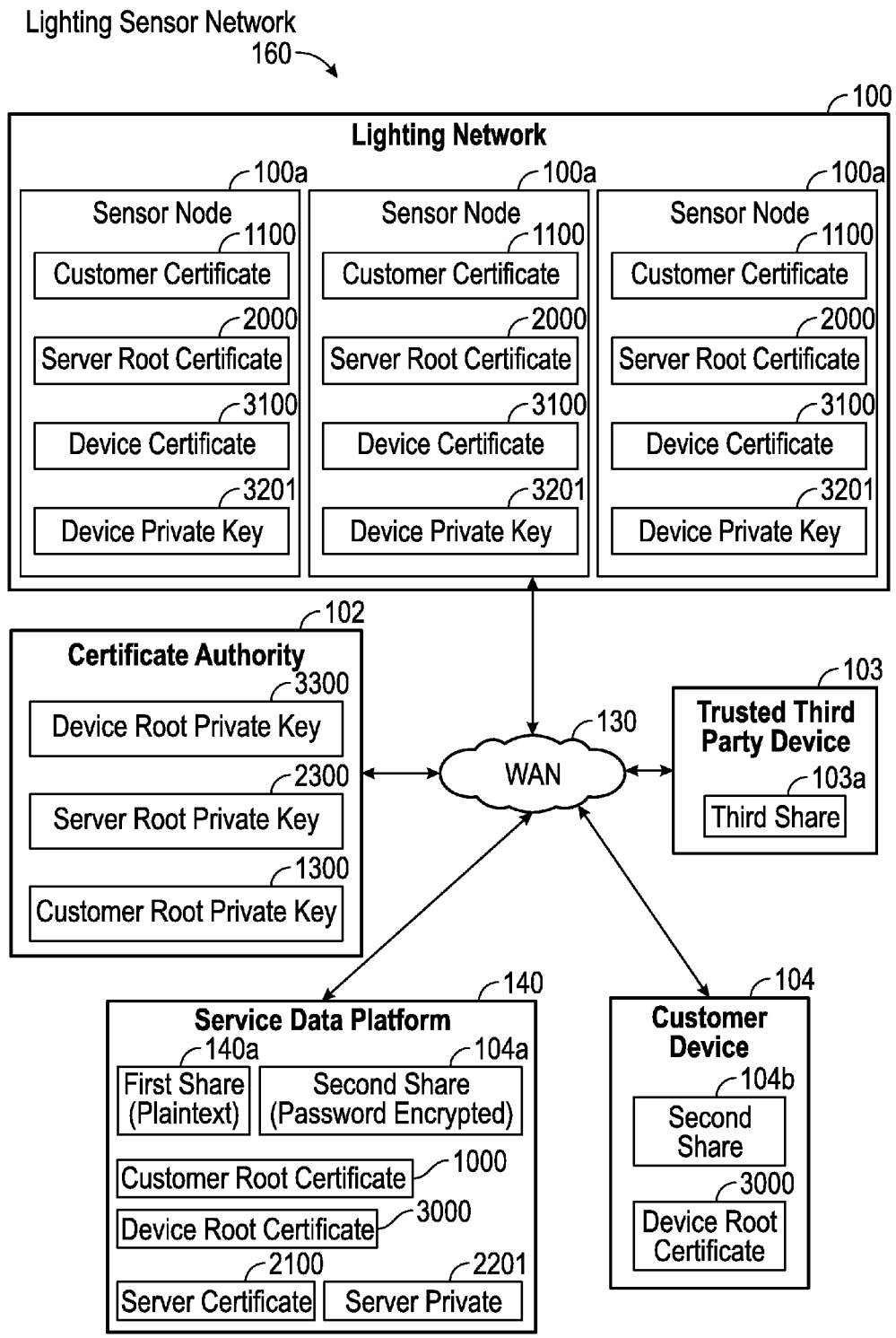
FIGS. 3B-3D illustrate various block diagrams of a lighting sensor network having keys, certificates and shares distributed among multiple devices within the lighting sensor network or devices in communication with the lighting sensor network, according to example embodiments.

FIG. 3B illustrates a high level block diagram of a lighting sensor network 160 implementing public-key cryptography using a private key sharing scheme for customer key-pairs. The lighting sensor network 160 includes the lighting network 100, the service data platform 140 in communications with a customer device 104 and a trusted third party device 103. The sensor nodes 100a may encrypt the sensor data available at the sensor nodes 100a and establish a secure connection with the service data platform 140 over the WAN 130. The customer device 104 may represent a client device used by the customer to log into the service data platform 140 to request a new customer key-pair. The customer may request the customer key-pair while installing or updating the lighting network 100 to ensure secure communications between the devices within the lighting sensor network 160 and unauthorized access to its customer data. In various examples, the customer may represent the owner of a lighting infrastructure, owner of a sensor network 100, owner of sensor data or any else authorized to collect and access sensor data from the sensor nodes 100. The customer may also represent the customer of the service data platform 140.

As indicated above, the certificate authority 102 within the PKI 101 (shown in FIG. 2) issues the digital certificates associated with key-pairs. The digital certificate contains the public key and the identity of the owner of the key-pair. For example, the owner may be the customer for a customer key-pair. The digital certificate provides a confirmation of validation by the certificate authority 102 that the customer public key contained in the digital certificate belongs to the party (e.g., customer) noted in the digital certificate.

Once the PKI 101 creates the digital certificates, the PKI 101 distributes the digital certificates to the service data platform 140. In example embodiments, digital certificates associated with a customer key-pair, which contains the public key and identity of the owner, are distributed to the sensor nodes 100 within the lighting network 100. The Customer Certificates 1100 represent certified public keys owned by the customer. Once the sensor nodes 100a have access to the certified public key, the sensor nodes 100a may encrypt the sensor data collected at the sensor nodes 100 and other data available at the sensor nodes 100a. A secure connection may be established between the sensor nodes 100a within the sensor network 100 and the service data platform 140 to transport the encrypted sensor data. The secure connection may be established by one or more key-pairs associated with the sensor nodes 100 and the data service platform 140.

In various examples, the sensor nodes 100a may represent client devices that use the certificates to verify the signature on the certificates, as part of the verification before establishing a secure connection between the lighting network 100 and the service data platform 140. A sensor node 100a may attempt to establish a connection with the service data platform 140 and the service data platform 140 and sensor node 100a mutually authenticate each other. The service data platform 140 may present its Server Certificate 2100 to the sensor node 100a. The sensor node 100a, uses a Server Root Certificate 2000, stored locally at the sensor node 100a, to verify the signature on the Server Certificate 2100 is traceable back to the Server Root Certificate 2000 and to authenticate the service data platform 140. The sensor node 100a sends the Device Certificate 3100 to the service data platform 140. The service data platform 140 uses the Device Root Certificate 3000, stored locally at the service data platform 140, to authenticate that the sensor node 100a. The service data platform 140 is able to trace the Device Certificate 3100 back to the Root Device Certificate 3000. The digital certificates certify the ownership of a public key by the named subject of the certificate. The digital certificate allows others to rely upon signatures or assertions made by the private key that corresponds to the certified public key.

In example embodiments, the matching customer private key, used for decrypting the encrypted sensor data, is not made available publicly, but is kept secret by the owner or customer who generated the key-pair. In some embodiments, only participants in the private sharing scheme may have access to a share of the customer private key. In example embodiments, the service data platform 140 manages the customer private key for the customer by using a secret sharing algorithm or scheme. In various embodiments, the customer private key (also referred to a "secret") is distributed among a group of participants, each of whom is allocated a share of the secret. In some embodiments, the key distribution module 145 (shown in FIG. 2) is responsible for distributing the shares of the secret to various devices or participants in the secret sharing scheme. The secret or customer private key can be reconstructed when a sufficient number of shares are combined together. The key sharing module 143 (shown in FIG. 2) may be used to create the shares by using the secret sharing algorithm and may also be used to reconstruct the private key by combining multiple shares of the private key as specified by the secret sharing scheme being used. None of the individual shares can decrypt the encrypted data on its own. In various embodiments, the customer private key is destroyed or disposed of once the shares are created from the private key.

In the example embodiment shown in FIG. 3B, the customer private key was split into three shares (e.g., the first share 140a, the second share 104a and the third share 103) prior to being destroyed or otherwise disposed of. The second share referred to as 104a represents customer share stored by a server on the service data platform 140 and the second share referred to as 104b represents the customer share that is returned to the customer. Any combination of two of the three shares 140a, 104a (or 104b), and 103a is sufficient to decrypt the encrypted to sensor data stored in the service data platform 140 in accordance with the private key sharing scheme. When the key-pair generating module 141 (shown in FIG. 2) generates the three shares 140a, 104a, and 103a of the customer private key, each of the three shares contains at least two thirds of the customer private key so that a combination of two of the shares 140a, 104a, and 103a may be used to reconstruct the customer private key. In alternative embodiments, the private sharing scheme may use more than three shares with each share including at least a portion of the customer private key necessary to reconstruct the customer private key with the designated number of shares specified in the private key sharing scheme.

In one example, the first share 140a and the second share 104a, which are both stored on the service data platform 140, and may be used to decrypt the encrypted sensor data when the service data platform 140 receives a request from an authorized user. The authorized user may log into the service data platform 140 and provide the password or passcode for the second share 104a, prior to generating a request to access the encrypted sensor data. For example, the authorized user may use the customer device 104 to log onto the service data platform 140. In alternative embodiments, a combination of the second share 104a and the third share 103a may be used to decrypt the encrypted sensor data. In further embodiments, the first share 140a and the third share 103a may be used to decrypt the encrypted sensor data.

In an example, the customer through the customer device 104 may request the encrypted sensor data be transmitted over the WAN 130 to the trusted third party device 103 or the customer device 104. Once the encrypted sensor data is received by the trusted third party device 103 or the customer device 104, the encrypted sensor data may be decrypted by the combination of the second share 104b and the third share 103a. In certain situations where the sensor data may contain sensitive identification information that the customer may not want to share with the service data platform 140 owner or administrator, the customer may decide to transport the encrypted sensor data off the service data platform 140 before decrypting the encrypted sensor data. In other words, the sensor data is decrypted offline from the service data platform 140.

In another example, the trusted third party device 103 may be an escrow company who holds the third share 103a in escrow. In the event that the second share 104a or 104b is lost, damaged or otherwise inaccessible, the third share 103a may be securely sent to the service data platform 140 and used to decrypt the encrypted sensor data stored on the service data platform 140. The third share 103 may also be password encrypted for additional security.

In other embodiments, the customer may decide to manage access to the private key itself such that the service data platform 140 may not decrypt any of the encrypted sensor data collected and stored on the service data platform. Request for key-pairs and distribution of the key-pairs may be handled by the customer on a device separate from the service data platform 140. Once the customer is issued key-pairs, the customer public keys may be provided to the service data platform 140 for distribution by the service data platform 140 to the sensor nodes 100. However, the customer private key may not be provided to the service data platform 140 and the private key sharing scheme may be managed by the customer or another party selected by the customer. In this scenario, the service data platform 140 primarily provides database services to store the encrypted sensor data.

In the example embodiment shown in FIG. 3B, the customer private key is split or divided into three shares. The first share 140*a* may be referred to as the server share, the second share 104*a* (and 104*b*) may be referred to as the customer share, and the third share 103*a* may be referred to as the trusted third party share. Once the three shares are created, the customer private key may be destroyed or otherwise disposed of. In example embodiments, the service data platform 140 provides security functionality to split the private key into three shares and then dispose of the customer private key once the three shares are created. In some embodiments, the key pair generating module 140 (shown in FIG. 2) may be used to split the private key into multiple shares. In this example, any two of the three shares combined together is sufficient to decrypt the encrypted sensor data. In various alternative embodiments, the private key sharing scheme may split the private keys into any number of shares (e.g., four shares, five shares, etc.), where a subset of the number of shares is required to be combined to decrypt the encrypted sensor data.

Referring to FIG. 3B, the first share 140*a* representing the server share may be stored in plain text in a database in the service data platform 140. The second share 104*a*, represents a password encrypted local customer share, may also be stored in a database in the service data platform 140. The second share 104*a* requires a customer password before the encrypted sensor data can be decrypted. In some embodiments, the second share 104*b*, which may or may not be encrypted, is returned to the customer. The customer may use the customer share 104*b* in combination with the third share 103*a*, to decrypt the encrypted sensor data offline from the service data platform 140.

A trusted third party may represent any entity selected by the customer who represents a trusted party. For example, the trusted third party may be an escrow company. The trusted third party share, referred to as the third share 103*a*, may be securely transferred to the trusted third party for safe keeping in the event the second shares 104*a* and 104*b* are lost, or for use in offline decrypting in combination with the second share 104*b*.

By using the PKI 101, users accessing the lighting sensor network 160 and computers (or computing devices) within the lighting sensor network 160 may both securely exchange data over networks such as the Internet and verify the identity of the other party. For example, sensor data generated at the sensor nodes 100 may be encrypted and securely transported over a network to the service data platform 140. The encrypted sensor data may be stored at the service data platform 140 and decrypted by using a private key sharing scheme. The service data platform 140 may verify that that the encrypted sensor data was provided by customer devices (e.g., sensor nodes 100 owned by the customer).

As described above, the customer certified public key (represented by the Customer Certificate 1100) may be widely distributed to the various sensor nodes 100*a*. In some embodiments, the key distribution module 145 may distribute the Customer Certificates 1000. On the other hand, the customer private key is made available only to the participants of the private key sharing scheme. More specifically, the sensor nodes 100*a* may collect raw sensor data (and other data available at the sensor nodes 100*a*) which is encrypted before being transported over a network (e.g., WAN 130) to the service data platform 140 for storage, and in some cases, for further processing.

The service data platform 140 may represent remote servers located in a cloud computing environment. The encrypted sensor data may be stored in its encrypted form until a request to access the encrypted sensor data is received by the service data platform 140 from an authorized user. The encrypted data may be decrypted using two of the three shares shown in FIG. 3B in example embodiments. In various embodiments, one or more of the shares of the customer private key may request a passphrase (or passcode) before decrypting. In some embodiments, a passphrase may be supplied manually. In other embodiments, a user may be allowed to store the passphrase locally so that messages can be decrypted automatically. As described above, the second share 104*a* may require a passphrase, either manual or automatically.

In various embodiments, responsibility for the customer private key is shared between multiple parties, such as the administrator or owner of the service data platform 140, the customer, and a trusted third-party. A sharing technique may be implemented using cryptographic key-sharing to split the key into multiple parts, some of which can be used together to recover, reconstruct, or replace the entire customer private key. The service data platform 140 provides a server to hold on to the password encrypted local customer share. In some examples, the service data platform 140 is not able to decrypt the local share unless the customer provides the password, which may need to be provided at least for each login session to the server.

FIG. 3B illustrates the various keys and digital certificates that may be used to implement public key cryptography for data security of the lighting sensor network 160, according to example embodiments. The computing devices in the lighting sensor network 160 and users of the lighting sensor network 160 are assigned signed key-pairs for secure communication. The keys and certificates in use are described below.

The Server Root Certificate 2000 and Server Root Private Key 2200 represent the certificate and key-pair that is used to sign all Server Certificates 2100. The Server Root Certificate 2000 is distributed to all devices (e.g., sensor nodes 100*e*) that connect to a server in the service data platform 140. FIG. 3B illustrates the Server Root Certificate 2000 stored locally at the sensor nodes 100*a*. The Server Root Private Key 2200 must be kept very secure, as it is difficult to revoke. In some embodiments, the Server Root Private Key 2200 is kept in a secure location that is only known to the certificate authority 102. The Server Root Private Key 2200 is only used for signing the Server Certificates 2100. The Server Private Key 2201 corresponds to a Server Certificate 2100 and is different from the Server Root Private Key 2200.

The Server Certificate 2100 and Server Private Key 2200 represent the certificate and key-pair used by the server in the service data platform 140 for all device connections to that server. The Server Certificates 2100 are signed by the Server Root Private Key 2300. FIG. 3B illustrates the Server Certificate 2100 and the Server Private Key 2200 stored locally at the service data platform 140.

The Device Root Certificate 3000 and Device Root Private Key 3200 represent the certificate and key-pair used to sign all Device Certificates 3100. The Device Root Certificate 3000 is distributed to all servers within the service data platform 140 to validate the identity of devices (e.g., sensor nodes 100*a*). The Device Root Private Key 3200 must be kept very secure, as it is difficult to revoke. In some embodiments, the Device Root Private Key 3200 is kept in a secure location that is only known to the certificate authority 102. The Device Root Private Key 3200 is only used for signing the Device Certificates 3100. The Device Private Key 3201 corresponds to a Device Certificate 3100 and is different from the Device Root Private Key 3200.

The Device Certificate 3100 and Device Private Key 3201 represent the certificate and key-pair that gets assigned to any node, service bridge and any other wireless station or client of a server in the service data platform 140. The Device Certificates 3100 are signed by the Device Root Private Key 3200.

The Customer Root Certificate 1000 and Customer Root Private Key 1200 represent the certificate and key-pair used to sign all Customer Root Certificates 1100. The Customer Root Certificate 1100 is distributed to servers within the service data platform 140 and may be used to validate the identity of customers when they log in. The Customer Root Private Key 1200 must be kept very secure, as it is difficult to revoke. In some embodiments, the Customer Root Private Key 1200 is kept in a secure location that is only known to the certificate authority 102. The Customer Root Private Key 1200 is only used for signing the Customer Certificates 1100. The customer private key corresponds to a Customer Certificate 1100 and is different from the Customer Root Private Key 1200. The customer private key is reconstructed using a private key sharing algorithm.

The Customer Certificate 1100 and customer private key represent the key-pair that is used for encrypting all customer identifiable information and the person identifiable information at the sensor node 100*a*. The customer private key is under the control of the customer and is signed by the server. The Customer Certificate 1100 is distributed to the devices owned by the customer (e.g., the sensor nodes 100*a*) for encryption of data. Once the data is encrypted by those devices it cannot be decrypted because those devices never possess the corresponding customer private key.

As shown in FIG. 3B, the various entities in the lighting sensor network 160 and in communication with the lighting sensor network each hold a subset of the keys and secrets. The key distribution module 145 is responsible for distributing the various keys, certificates, and shares to the various devices shown in FIG. 3B in example embodiments.

In example embodiments, the sensor nodes 100*a* (or devices) store the following certificates and keys locally: the Device Certificate 3100 and the Device Private Key 3201; the Server Root Certificate 2000; and the Customer Certificate 1100.

In example embodiments, the service data platform 140 (or server) stores the following certificates and keys locally: the Server Certificate 2100 and the Server Private Key 2201; the Customer Root Certificate 1000; the Device Root Certificate 3000; the server customer key share (e.g., the first share 140*a*); and the encrypted local customer key share (e.g., the second share 104*a*).

In example embodiments, the customer device 104 stores the following certificates and keys locally: the Device Root Certificate 3000; the customer private key or at least the customer key share represented by the second share 104*b*.

In further embodiments, the certificate authority 102 stores locally the root private keys for the devices, servers and customers represented by the Device Root Private Key 3300, the Server Root Private Key 2300, and the Customer Root Private Key 1300, respectively.

Figure 3C:
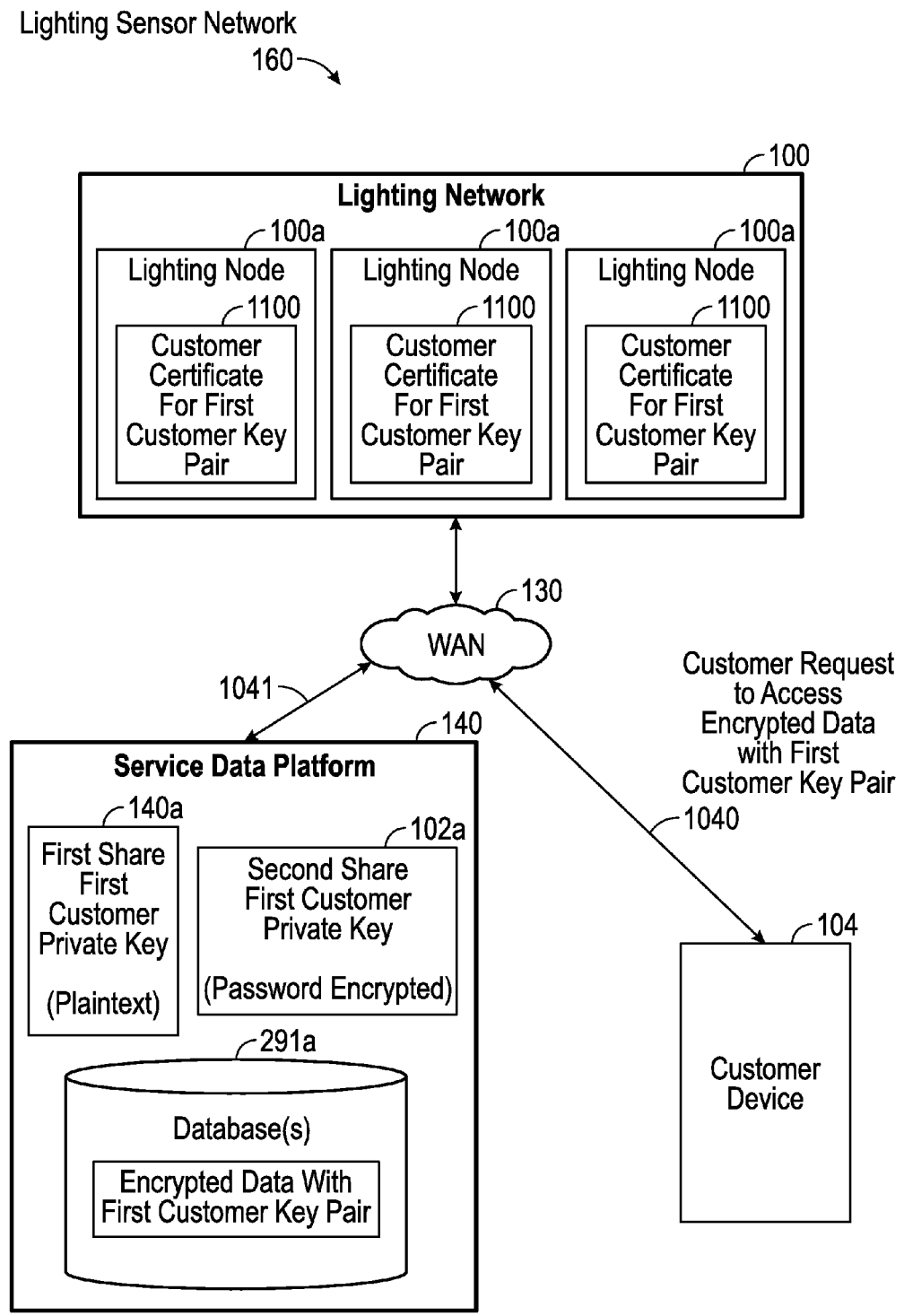

FIG. 3C illustrates a block diagram of the lighting sensor network 160 with a customer device 104 requesting access (over paths 1040 and 1041) to sensor data stored in the service data platform 140 that was encrypted by a Customer Certificate 1100 from first customer key-pair, according to an example embodiment. In other words, the same customer key-pair that is used to encrypt the sensor data at the sensor nodes 100 is being used by the service data platform 140 to decrypt the encrypted sensor data for new sensor data collected by the sensor nodes 100*a*.

Figure 3D:
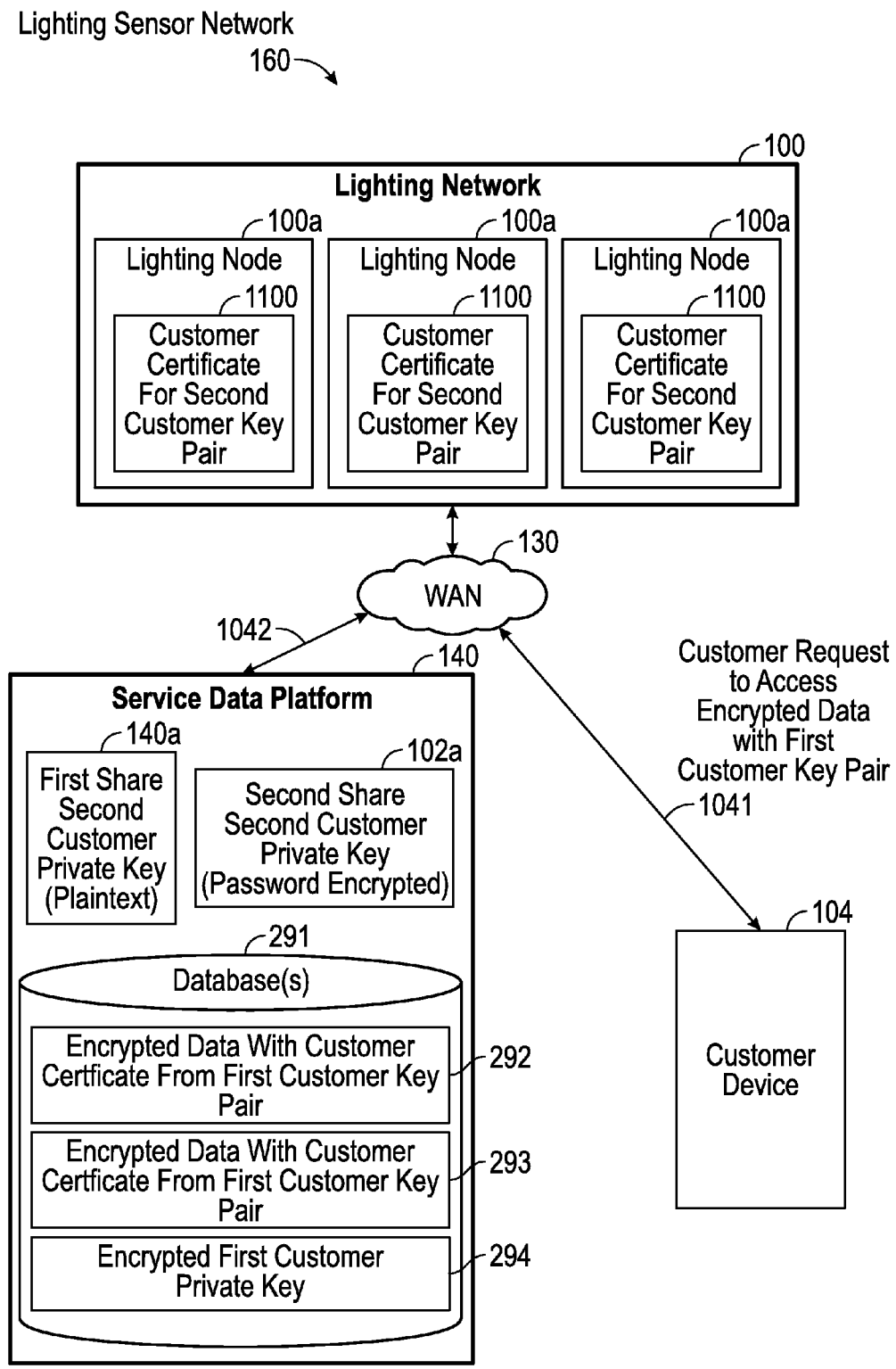

On the other hand, FIG. 3D illustrates a block diagram of the lighting sensor network 160 with a customer device 104 requesting access (over paths 1040 and 1041) to sensor data stored in the service data platform 140 (as old sensor data) that was encrypted by a Customer Certificate 1100 from first customer key-pair that is associated with a recovered customer private key from the first customer key-pair. The recovered customer private key from the first customer key-pair has been encrypted by the service data platform 140 and then stored on the service data platform 140 such that the customer 104 may still access sensor data encrypted using the customer certificate associated with the first customer key-pair. In example embodiments, one or more databases 291 stores the encrypted data with the Customer Certificate 1100 from the first customer key-pair 292; encrypted data with the Customer Certificate 1100 from the second customer key-pair 293; and encrypted first customer private key 294.

The process for recovering a customer private key from the first customer key-pair and then encrypting the recovered customer private key from the first customer key-pair is described in further detail below in conjunction with FIG. 6. In example embodiments, the key recovery module 142 provides functionality to recover private keys in accordance with the method shown in FIG. 6. In this scenario, when the private key for the first customer key-pair represents a recovered private key, a new private key associated with a second customer key-pair is generated. In various embodiments, new data collected by the senor nodes 100*a* are then encrypted using the Customer Certificate 1100 associated with the second customer key-pair and then decrypted using the private key sharing scheme associated with the second customer key-pair. The recovered private key from the first customer key-pair is encrypted by the service data platform 140. The recovered private key from the first customer key-pair is decrypted by the service data platform 140 before it can be used to decrypt the encrypted old sensor data. In example embodiments, the private key sharing (e.g., shares 140*a*, 104*a*, 104*b*, and 103*a*) associated with the second customer key-pair may be used to decrypt the recovered private key from the first customer key-pair, which was encrypted by the Customer Root Certificate 1000 associated with the second customer key-pair. Once the old sensor data has been decrypted, it may be accessed by the customer device 104 using a second customer key-pair, according to an example embodiment. In other words, the customer device 104 requests access to sensor data that was encrypted with an old customer key-pair (e.g., the first customer key-pair), and a new customer key-pair (e.g., the second customer key-pair) is currently being used by the lighting sensor network 160.

Figure 4:
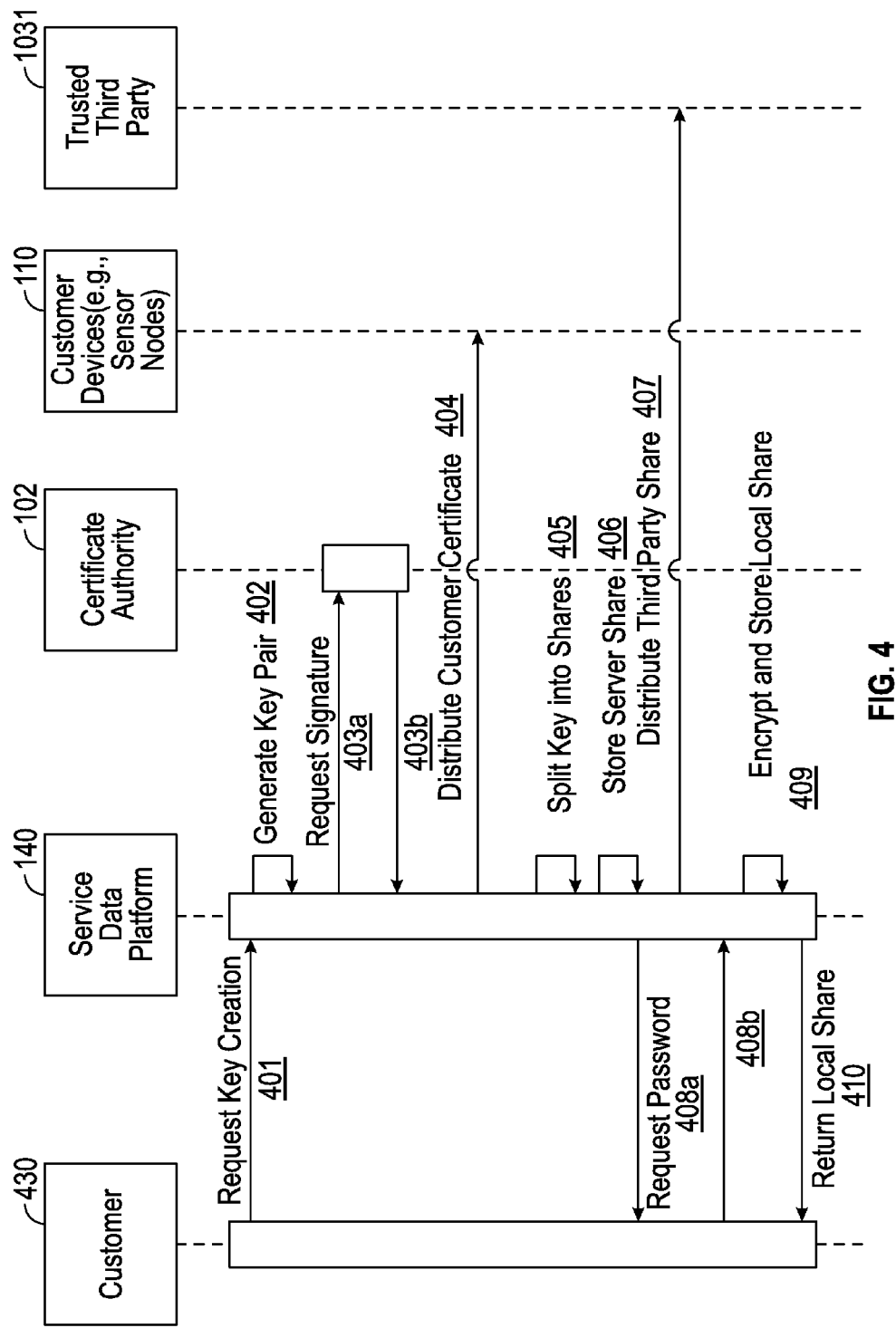
FIG. 4 is a diagram illustrating a method for a customer to create a certificate and key-pair, according to example embodiments.
Figure 5:
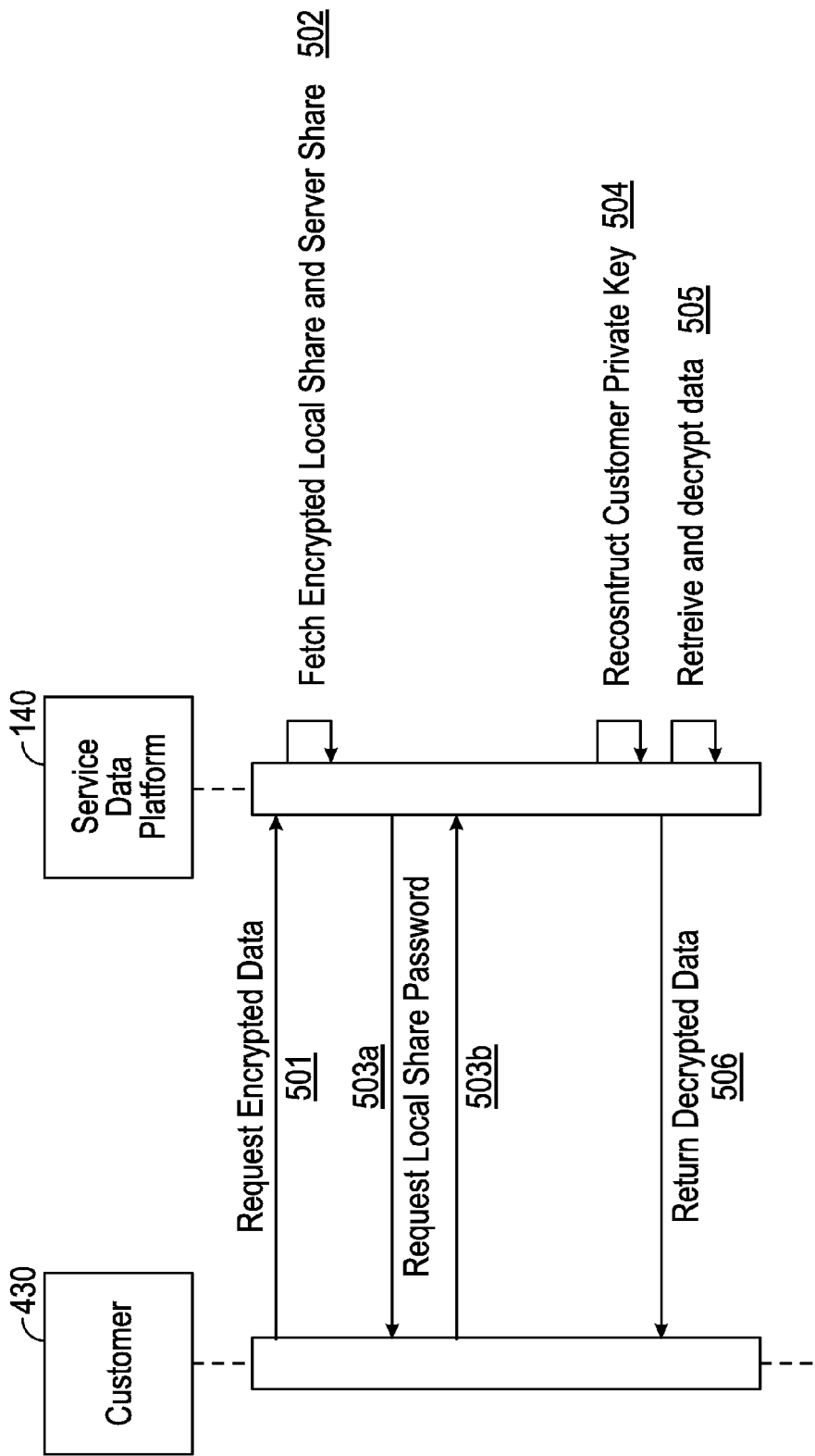
FIG. 5 is a diagram illustrating a method for a customer to decrypt and access data stored at a service data platform, according to example embodiments.
Figure 6:
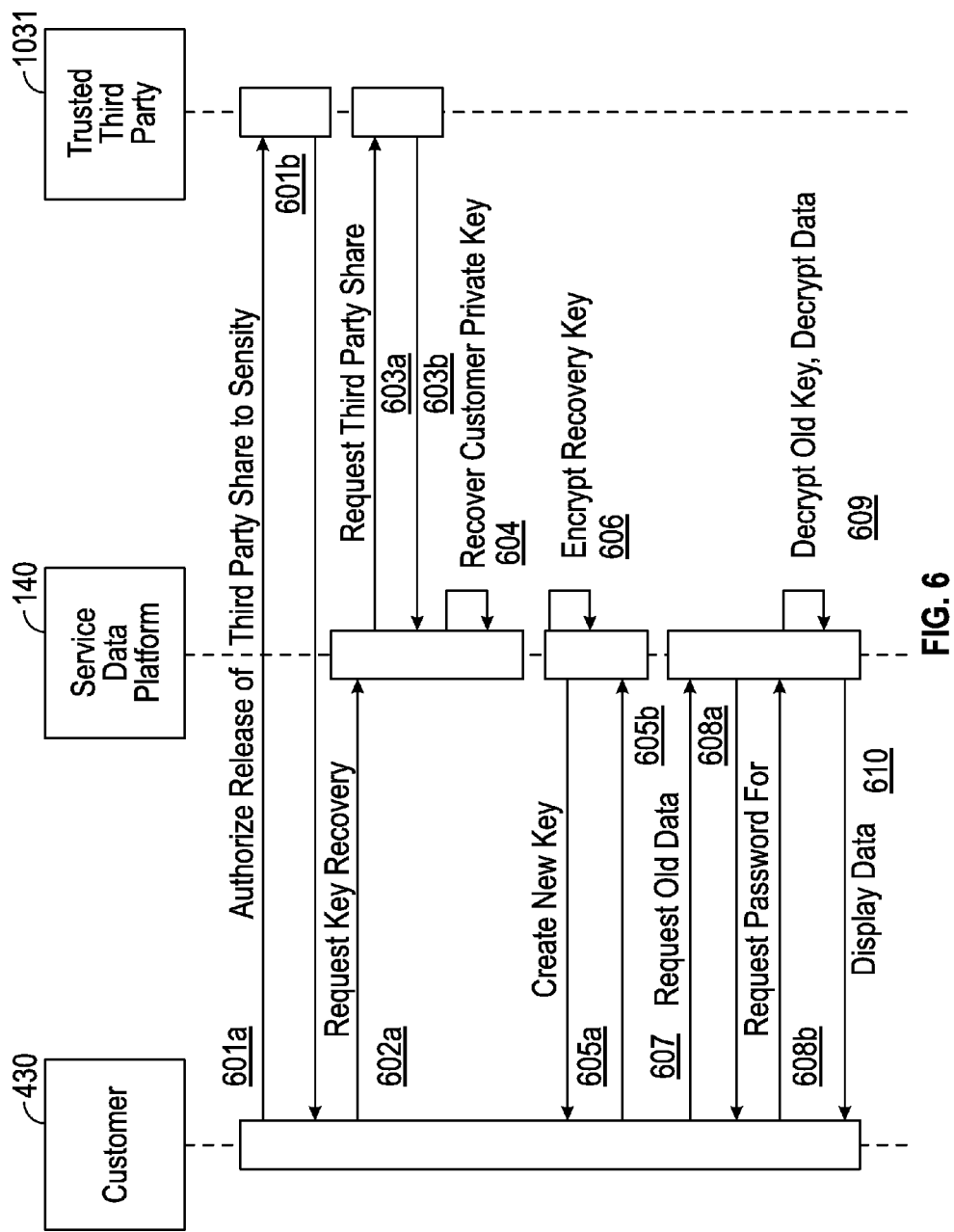
FIG. 6 is a diagram illustrating a method for a customer to recover a private key, according to example embodiments.

In example embodiments, the methods shown in FIGS. 4-6 and the operations described in the methods, may be implemented using one or more of the modules 141, 142, 143, 145, and 146, alone or in combination with other modules, included in the security system 144 (shown in FIG. 2). Additional modules which are not shown in FIG. 2 may also be used. For example, an encryption module is not shown and a decryption module is not shown, but are included within the security system 144.

FIG. 4 illustrates an example of a diagram for a method to encrypt sensor data according to various embodiments. The diagram shown in FIG. 4 may be referred to as the customer initiation procedure. The method shown in FIG. 4 includes operations 401-410 in example embodiments. At operation 401, a customer 430 makes a request to create a new customer key-pair. The new customer key-pair may include a certified public key represented by the Customer Certificate 1100. The customer 430 may wish to create a new digital certificate and private key that implements a private key sharing scheme for data encryption. The request is sent to the service data platform 140.

In one embodiment, the service data platform 140 generates the customer key-pair as shown by operation 402. In some embodiments, the service data platform 140 synthesizes a new key-pair, and in other embodiments, the customer 430 generates the customer key-pair and provides the customer public key and possibly the customer private share (e.g., first share 140a) to the service data platform 140. In further embodiments, the customer private key may be withheld by the customer 430 in which case the service data platform 140 may not be able to directly decrypt the customer's data.

According to some embodiments, once the key-pair is generated by the service data platform 140, the service data platform 140 sends a request 403a to the certificate authority 102 as shown by operation 403a. In various embodiments, the certificate authority 102 is part of the PKI 101. The request at operation 403a may be to request the certificate authority 102 to sign the customer pubic key. At operation 403, the certificate authorize 102 returns the signature of the certificate authority 102 as part of digital certificate to the service data platform 140.

The signed digital certificate represents a certified customer public key. The certificate authority 102 may provide Customer Certificates 1100 which are stored locally at the sensor nodes 100a and a Customer Root Certificate 1000, which is stored at the service data platform. The Customer Certificates 1100 may be assigned to or distributed to the various sensor nodes 100a or other devices within the sensor network 100. The Customer Certificate 1100 is used by the sensor nodes 100a to encrypt sensor data or other data available to the sensor nodes 100a.

In other embodiments, the service data platform 140 may send a request (on behalf of the customer) to the certificate authority 102 to issue a key-pair and associated digital certificates, such as the Customer Certificate 1100. The certificate authority 102 then creates the key-pair and associated digital certificates and sends them back to the service data platform 140.

Once the service data platform 140 receives signed Customer Certificates 1100, the service data platform 140 distributes the Customer Certificates 110 representing the certified public keys from the customer key-pairs, to the customer devices (e.g., the sensor nodes 100) at operation 404. The sensor nodes 100 may represent the devices owned by the customer 430. The public key is included within the Customer Certificate 1100 in some embodiments. In some embodiments, the signed Customer Certificate 1100 is then returned to the customer who then distributes it to the devices that the customer owns. In some embodiments, if the customer has chosen to withhold the private key, no further action is taken.

The reference numerals 405 and 406 represent operations performed by the service data platform 140. For embodiments where the service data platform 140 is managing the private key for the customer 430, the private key is split into multiple shares (e.g., three shares) by the service data platform 140.

At operation 405, the service data platform 140 splits the private key into multiple shares using a private (or secret) sharing algorithm. At operation 406, the service data platform 140 stores the server share on the service data platform 140. In example embodiments, the server share is stored in plain text in a database in the service data platform 140.

At operation 407, the service data platform 140 then transfers the third party share to the trusted third party 1031. For example, the third-party share is securely transferred to the trusted third party device 103 for safe keeping or for use in offline decryption by the customer 430.

At operation 408a, the service data platform 140 sends a request for a password or passcode to the customer 430 that can be used to encrypt the customer share. The passcode may be received from the customer 430 at operation 408b. For example, the customer is prompted for a password to encrypt the customer share.

At operation 409, the service data platform 140 encrypts the customer share of the private key and stores the password encrypted customer share of the private key in one of the database(s) 291 in the service data platform 140.

The service data platform 140 may then return the customer share at operation 410 to the customer. The customer share may be encrypted or not encrypted. The customer may use the customer share received if the password encrypted customer share is lost, or may be used for encryption of the decrypted sensor data accessed from the service data platform 140 in combination with the trusted third party share, for example.

In example embodiments, the operation 401, 403a, 403b, 408a, 408b, and 410 may be performed by the communications module 146. In other embodiments, operations 404 and 407 may be performed by the key distribution module 145. In further embodiments, the operation 402 may be performed by the key-pair generation module 141. In some embodiments, the operations 405 and 406 may be performed by the key sharing module 143. The modules 146, 145, 141, and 143 are shown in FIG. 2 as part of the security system 144.

In an example embodiment, a method is described for protecting data available to sensor nodes 110 within a sensor network 100. The method includes: generating a key-pair associated with a customer including a public encryption key and a private decryption key; requesting certification of the public encryption key; receiving a certificate representing a certified public encryption key; distributing the certificate to the sensor nodes within the sensor network 100 associated with the customer to enable the sensor nodes to encrypt sensor data available at the sensor nodes 110 with the certificate; splitting the private decryption key into multiple shares such that a designated subset of the multiple shares may be used in combination to enable a service data platform 140 to decrypt the encrypted sensor data; storing a first share 140a of the multiple shares at the service data platform 140; storing a password encrypted local share of a second share 104a of the multiple shares at the service data platform 140; and transmitting a third share 103a of the multiple shares to a third-party device (e.g., the trusted third party device 103) for storage. In some embodiments, requesting certification of the public encryption key includes requesting a certificate authority 102 to generate Customer Certificates 1100 associated with the key-pair.

In further embodiments, the method for protecting data available to sensor nodes 110 within a sensor network 100 includes receiving a request associated with the customer to generate the key-pair. The key-pair represents a customer key-pair. In further embodiments, the method for protecting data available to sensor nodes 110 within a sensor network 100 includes transmitting the second share 104b of the multiple shares to a customer device 104. In another embodiment, the method for protecting data available to sensor nodes 110 within a sensor network 100 includes destroying the private decryption key after splitting the private decryption key into multiple shares.

Various other security algorithms or schemes may be implemented by the service data platform 140 to provide added security to the sensor data collected at the sensor nodes 100. As indicated above, the sensitive identification data may be collected by at the sensor nodes 100, which may include personally identifiable information and customer identifiable information. For example, camera, microphone or other data may be collected at the sensor nodes 100.

For some embodiments, the sensor nodes 100 may be bucket or group the sensor data into hourly or daily digests to remove time sensitivity. This protects against inferring content of the sensor data by monitoring the frequency of communications between the sensor nodes 100 and the service data platform 140.

In other embodiments, the sensor nodes 100 may pad (or adjust the size) of the sensor data to a fixed size to remove size sensitivity. This protects against inferring content of the data by monitoring the quantity of data sent to the server. The security algorithms or schemes may be used alone or together with various embodiments of the public key cryptography described in this specification. The sensor data collected at the sensor nodes 100 may be sent to the service data platform 140 over a secure connection. The service data platform 140 stores the sensor data where it can be accessed by the customer in the future.

In further embodiments, a data package is encrypted using the Customer Certificate 1100. The data package may represent sensor data collected at the sensor nodes 100 that is to be transmitted to the service data platform 140 over a network (e.g., WAN 130). In some embodiments, the encrypted data packet is combined with unencrypted metadata in a multipart payload, which is then signed using the Device Private Key 3201. The signed multipart payload may be sent to the service data platform 140 over a secure connection. In further embodiments, the service data platform 140 sores the encrypted data package in one or more of database(s) 291 indexed by the unencrypted metadata keys so that the encrypted data package can be retrieved by the customer in the future. The service data platform 140 may use a cryptographic hash of the signed payload as a content addressable file key.

FIG. 5 illustrates a diagram of a method for decrypting sensor data according to example embodiments. The service data platform 140 is storing encrypted sensor data received from the sensor nodes 100. The sensor data was encrypted by the sensor nodes 100 and then transported to the service data platform 140 for storage.

At operation 501, the customer 430 sends a request to access the encrypted sensor data stored at the service data platform 140. In various embodiments, the customer 430 logs into the service data platform 140 using its credentials (e.g., username and password). The customer 430 may also request to view the sensor data that is encrypted using the customer certificate.

At operation 502, the service data platform 140 fetches the password protected encrypted local customer share and the server share. In some embodiments, the service data platform 140 obtains the encryption information from its database (e.g., database 291), including information on what Customer Certificate 1100 was used to encrypt the sensor data, the server share and the encrypted local share of the customer share.

At operation 503a, the service data platform 140 sends a request for the encrypted local customer share password to the customer 430. At operation 503b, the service data platform 140 receives the password from the customer 430.

The service data platform 140 obtains the password for the encrypted local share from the customer 430 and decrypts the encrypted local customer share if the correct password is provided.

At operation 504, the service data platform 140 reconstructs the customer private key once the password is received. For example, where the private key sharing scheme uses three shares, each share includes at least two-thirds of the private key so the private key can be reconstructed with only two shares. Together, the decrypted local customer share and the server share are used to decrypt the encrypted sensor data stored at the service data platform 140. The service data platform 140 retrieves the encrypted sensor data and then decrypts it at operation 505.

At operation 506, the service data platform 140 provides a response that returns the decrypted sensor data to the customer 430. In some embodiments, the decrypted sensor data is transmitted to the customer's browser over a secure connection and rendered to the screen by the browser.

In example embodiments, operations 501, 503a, 503b, and 506 are performed by the communication module 146. In various embodiments, operations 502 and 504 are performed by the key sharing module 143. In another embodiment, the operation 505 may be performed by the security system 144. In some embodiments, the operation 505 may be performed by a decryption module (not shown). The modules 146, 143, 144 are shown in FIG. 2.

In an example embodiment, a method of protecting customer data in a networked system (e.g., the lighting sensor network 160) includes: collecting sensor data available at sensor nodes 110 within a sensor network 100 in communication with a service data platform 140 over a network (e.g., WAN 130); encrypting the sensor data using a certified public key associated with a customer key-pair, the sensor data representing the customer data associated with sensitive identification information; cryptographically signing the sensor data with a device private key; transporting the encrypted sensor data to the service data platform 140 for storage; and decrypting, at the service data platform 140, the encrypted sensor data using a private key sharing scheme that reconstructs the private key associated with the customer key-pair using a first share 140a and a password encrypted second share 104a, the first share 140a assigned to the service data platform 140 and the password encrypted second share 104a assigned to a customer of the customer key-pair.

In further embodiments, the method of protecting customer data in a networked system (e.g., the lighting sensor network 160) includes: receiving a request associated with an authorized user of the customer of the service data platform 140 to access the encrypted sensor data stored by the service data platform 140; receiving a password associated with password encrypted second share 104*a*; and decrypting the password encrypted second share 104*a*.

In other example embodiments, the method of protecting customer data in a networked system (e.g., the lighting sensor network 160) includes combining the first share 140*a* and the decrypted password encrypted second share 104*a* to reconstruct the private key associated with the customer key-pair.

In various embodiments, the sensitive identification information represents at one of customer identification information and personally identification information. In other embodiments, the private key sharing scheme includes at least three shares of the private key where at least two of the at least three shares may be used to reconstruct the private key associated with the customer key-pair for decrypting the encrypted sensor data.

In some embodiments, the customer 430 chooses not to share their private key with the service data platform 140 to prevent the service data platform 140 from decrypting the encrypted sensor data stored at the service data platform 140. However, the service data platform 140 may be able to deliver the encrypted sensor data to the customer who can then decrypt the data offline. A method for decrypting sensor data offline from the service data platform 140 is described below.

The method for decrypting sensor data offline from the service data platform 140 may start with the customer 430 who logs into the service data platform 140 using its log in credentials such as user name and password. The customer 430 then send a request to the service data platform 140 to access or retrieve the encrypted sensor data stored at the service data platform 140. The encrypted sensor data may be transported as a data package. The encrypted sensor data 140 may be downloaded from the service data platform 140 by the customer 430. The customer 430 may then obtain the Device Root Certificate 3000 from the service data platform 140. With the Device Root Certificate 3000 provided by the service data platform 140, the customer 430 is able to verify the signatures on the on the data package to ensure that the encrypted sensor data included in the data package is from the one or more of the customer's devices (e.g., sensor nodes 100). The customer 430 then decrypts sensor data using the customer's private key. If a private or secret sharing scheme is used, then the data package may be decrypted by a designated number of shares specified by the secret sharing scheme. The customer 430 may then view the decrypted sensor data using the customer's own tools and software applications.

FIG. 6 illustrates a diagram of a method for recovering a customer private key, according to various embodiments. In an example, embodiment the recovered customer private key is associated with a first customer key-pair. A new customer private key is created for a second customer key-pair.

In various embodiments, the key-pair generating module 141 is used to generate the second customer key-pair, and the key recover module 142 is used to recover the private key associated with the first customer key-pair when the customer's share is lost or no longer available to reconstruct the customer private key associated with the first customer key share. In further embodiments, the key sharing module 143 splits a customer private-key into multiple shares as required by the particular private key sharing scheme being implemented. The key-pair generating module 141, the key recovery module 142, and the key sharing module 143 are shown in FIG. 2.

According to FIG. 6, the customer 430 has used key sharing to protect itself against loss of the customer's share, or some other share of the private key issued to the customer (e.g., the second shares 104*a* and 104*b*. For example, the customer share 104*b* and the password for the encrypted local share of the customer's share 104*a* have been lost by the customer 430. The service data platform 140 may be requested to recover the lost data (associated with the customer's share of the private key associated with the first customer key-pair) with the help of the trusted third-party.

At operation 601*a*, the customer 430 authorizes the trusted third-party device 103 to release the third party share 103*a* to the service data platform 140. A response may be provided by the trusted third party device 103 at operation 601*b* that acknowledges this request.

At operation 602*a*, the customer 430 requests that the service data platform 140 recover the lost key or key share (e.g., shares 104*a* or 104*b*). At operation 603*a*, the service data platform 140 requests the third party share referred to as the third share 103*a* from the trusted third party 1031. At operation 603*b*, third share 103*a* is provided to the service data platform 140 by the trusted third party 1031. At operation 604, the service data platform 140 recovers the customer private key (associated with a first customer key-pair) by combining the third share 103*a* and the server share represented by the first share 140*a*.

In various embodiments, the private key associated with the first customer key-pair is reconstructed using two of the three shares from the private key sharing scheme. Each of the shares includes at least two-thirds of the customer private key from the first customer key-pair.

At operation 605*a*, the customer creates a new customer certificate and customer private key following the procedure or method outlined in FIG. 4 for generating a new key-pair. This procedure shown in FIG. 4 may be referred to as the customer initiation procedure. In example embodiments, the Customer Certificate 1100 and the customer private key are associated with a second customer key-pair, referred to as the new key-pair. The private key sharing scheme, for example as described in FIG. 5, is used to split the customer private key associated with the second customer key-pair into multiple shares. In some embodiments, an operation 605*b* may be used to provide the new private key associated with the second customer key-pair to the customer 430. The shares of the new customer private key may be distributed to the service data platform 140, the sensor nodes 100 and the customer device 104, as shown in FIG. 5 or FIGS. 3B-3D.

At operation 606 the service data platform 140 encrypts the recovered customer private key associated with the second customer key-pair with the new Customer Certificate 1100 and signs it with the Server Private Key 2200 The encrypted recovered private key associated with first customer key-pair is stored in the database 291. In example embodiments, when the old customer private key is needed, the new customer private key is needed to decrypt it. The new customer private key is reconstructed using the private sharing described above.

Once the second customer key-pair is generated, the sensor nodes 100 may encrypt sensor data using the Customer Certificate 1100 associated with the second customer key-pair. Such data can then be decrypted using the private key sharing scheme associated with the second customer key-pair. The sensor nodes 100 may also continue to encrypt sensor data using the Customer Certificate 1100 associated with the first customer key-pair. The recovered private key associated with the first customer key-pair is encrypted by the service data platform 140 and stored in one of its databases 291 to enable the customer 430 to decrypt data encrypted with the Customer Certificate 1100 associated with the first customer key-pair.

The sensor nodes 110 can continue to encrypt sensor data using the Customer Certificate 1100 from the first customer key-pair until the service data platform 140 distributes the Customer Certificate 1100 from the second customer key-pair to the sensor nodes 110.

At operation 607, the customer 430 requests encrypted data stored on the service data platform 140. As shown in FIG. 3D, the service data platform 140 may stores both data encrypted with the Customer Certificate 1100 from the first customer key-pair 292 and data encrypted with the Customer Certificate 1100 from the second customer key-pair 293. The data encrypted with the Customer Certificate 1100 from the first customer key-pair uses to the old (or recovered) key. The old (or recovered key) is used to decrypt the old data encrypted with the Customer Certificate 1100 associated with the first customer key-pair At operation 608a, the service data platform 140 checks to see if the sensor data was encrypted with a previously recovered key. If so, the service data platform 140, prompts for the password of the new password encrypted local share of the customer share. Once the password for the second share 104a is received, the service data platform 140 may decrypt the old private key.

At operation 609, the service data platform 140 decrypts the old private key which may be accessed from a database 292. The recovered private key associated with the first customer key-pair may be decrypted using the private key associated with the second customer key-pair. For example, the private key associated with the second customer key-pair may be reconstructed using the first share 140a and the second share 104a or 104b associated with the second private key-pair.

In various embodiments, there may be multiple key recoveries. When this occurs the service data platform 140 follows the chain of the older recoveries until a live key is found.

At operation 610, the decrypted sensor data may be displayed to a customer or other authorized user of the customer.

In example embodiments, the operations 602a, 602b, 607, 608a, 608b and 610 may be performed by the communications module 146. In other embodiments, the operations 603a and 603b, and 604 may be performed by the key recovery module 142. In some embodiments, the operation 605 may be performed by the key-pair generation module 141. The operation 606 may be performed by the encryption module (not shown). The operation 609 may be performed by the decryption module (not shown). The modules 146, 142, and 141 are shown in FIG. 2.

In example embodiment, method of protecting customer data in a networked system includes: receiving a request to access encrypted sensor data stored at a service data platform 140; determining the encrypted sensor data in the request was encrypted with a certified public key associated with a first customer key-pair, the first customer key-pair representing a recovered private key; determining the private key associated with the first customer key-pair is encrypted with the private key associated with a second customer key-pair; decrypting the private key associated with the first customer key-pair by using the private key associated with the second customer key-pair; and decrypting the encrypted sensor data in the request using the decrypted private key associated with the first customer key-pair. In some embodiments, the networked system includes a sensor network 100. The sensor network 100 represents at least one of a Wi-Fi wireless network or an ad hoc wireless network.

In other embodiments, the method of protecting customer data in a networked system includes: collecting sensor data available at sensor nodes 110 within a sensor network 100 in communication with the service data platform 140 over a network (e.g., WAN 130); encrypting the sensor data using the certified public key associated with the first customer key-pair, the sensor data representing the customer data associated with sensitive identification information; cryptographically signing the sensor data using a device private key associated with the first customer key-pair; and transporting the encrypted sensor data to the service data platform 140 for storage.

In further embodiments, the method of protecting customer data in a networked system includes: retrieving a third party share 103a associated with the first customer key-pair authorized by the customer to provide to the service data platform 140; combining the third party share (e.g., third share 103a) associated with the first customer key-pair with a server share (e.g., first share 140a) assigned to the service data platform; and recovering the private key associated with the first customer key-pair using the server share (e.g., first share 140a) and the trusted third party share (e.g., third share 103a).

In another embodiment, the method of protecting customer data in a networked system includes: encrypting the recovered private key associated with the first customer key-pair; and storing the encrypted private key associated with the first customer key-pair at the service data platform 140.

In another example embodiment, the method of protecting customer data in a networked system includes: requesting a password for a password decrypted customer share (e.g., the second share 104a) of the private key associated with the second customer key-pair to reconstruct the private key associated with the second customer key-pair; receiving the password and decrypting the password decrypted customer share (e.g., the second share 104a) associated with the second customer key-pair; combining a server share (e.g., the first share 140a) and the decrypting password encrypted customer share (e.g., the second share 104a) associated with the second customer key-pair; and reconstructing the private key associated with the second customer key-pair.

In a further embodiment, the method of protecting customer data in a networked system includes: encrypting the private key associated with the first customer key-pair by using a certified public key associated with the second customer key-pair; and storing the encrypted private key associated with the first customer key-pair.

Other examples of sensors 111 that may be used in various embodiments in sensor nodes 100 include biometric sensors, motion sensors, environmental sensors and position sensors. For example, the biometric sensors may include components to detect expressions (e.g., hand expressions, facial expressions, vocal expressions, body gestures, or eye tracking), measure bio signals (e.g., blood pressure, heart rate, body temperature, perspiration, or brain waves), identify a person (e.g., voice identification, retinal identification, facial identification, fingerprint identification, or electroencephalogram based identification), and the like. Examples of motions sensors may include motion components such as acceleration sensor components (e.g., accelerometer), gravitation sensor components, rotation sensor components (e.g., gyroscope), and so forth. Various environmental sensors may be used which include environmental components such as illumination sensor components (e.g., photometer), temperature sensor components (e.g., one or more thermometer that detect ambient temperature), humidity sensor components, pressure sensor components (e.g., barometer), acoustic sensor components (e.g., one or more microphones that detect background noise), proximity sensor components (e.g., infrared sensors that detect nearby objects), gas sensors (e.g., gas detection sensors to detection concentrations of hazardous gases for safety or to measure pollutants in the atmosphere), or other components that may provide indications, measurements, or signals corresponding to a surrounding physical environment. Various positions sensors may include position components such as location sensor components (e.g., a Global Position System (GPS) receiver component), altitude sensor components (e.g., altimeters or barometers that detect air pressure from which altitude may be derived), orientation sensor components (e.g., magnetometers), and the like.

Additionally, certain embodiments described herein may be implemented as logic or a number of modules, engines, components, or mechanisms. A module, engine, logic, component, or mechanism (collectively referred to as a "module") may be a tangible unit capable of performing certain operations and configured or arranged in a certain manner. In certain example embodiments, one or more computer systems (e.g., a standalone, client, or server computer system) or one or more components of a computer system (e.g., a processor or a group of processors) may be configured by software (e.g., an application or application portion) or firmware (note that software and firmware can generally be used interchangeably herein as is known by a skilled artisan) as a module that operates to perform certain operations described herein.

In various embodiments, a module may be implemented mechanically or electronically. For example, a module may comprise dedicated circuitry or logic that is permanently configured (e.g., within a special-purpose processor, application specific integrated circuit (ASIC), or array) to perform certain operations. A module may also comprise programmable logic or circuitry (e.g., as encompassed within a general-purpose processor or other programmable processor) that is temporarily configured by software or firmware to perform certain operations. It will be appreciated that a decision to implement a module mechanically, in dedicated and permanently configured circuitry, or in temporarily configured circuitry (e.g., configured by software) may be driven by, for example, cost, time, energy-usage, and package size considerations.

Accordingly, the term "module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiples of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, one module may perform an operation and store the output of that operation in a memory device to which it is communicatively coupled. A further module may then, at a later time, access the memory device to retrieve and process the stored output. Modules may also initiate communications with input or output devices and can operate on a resource (e.g., a collection of information).

Figure 7:
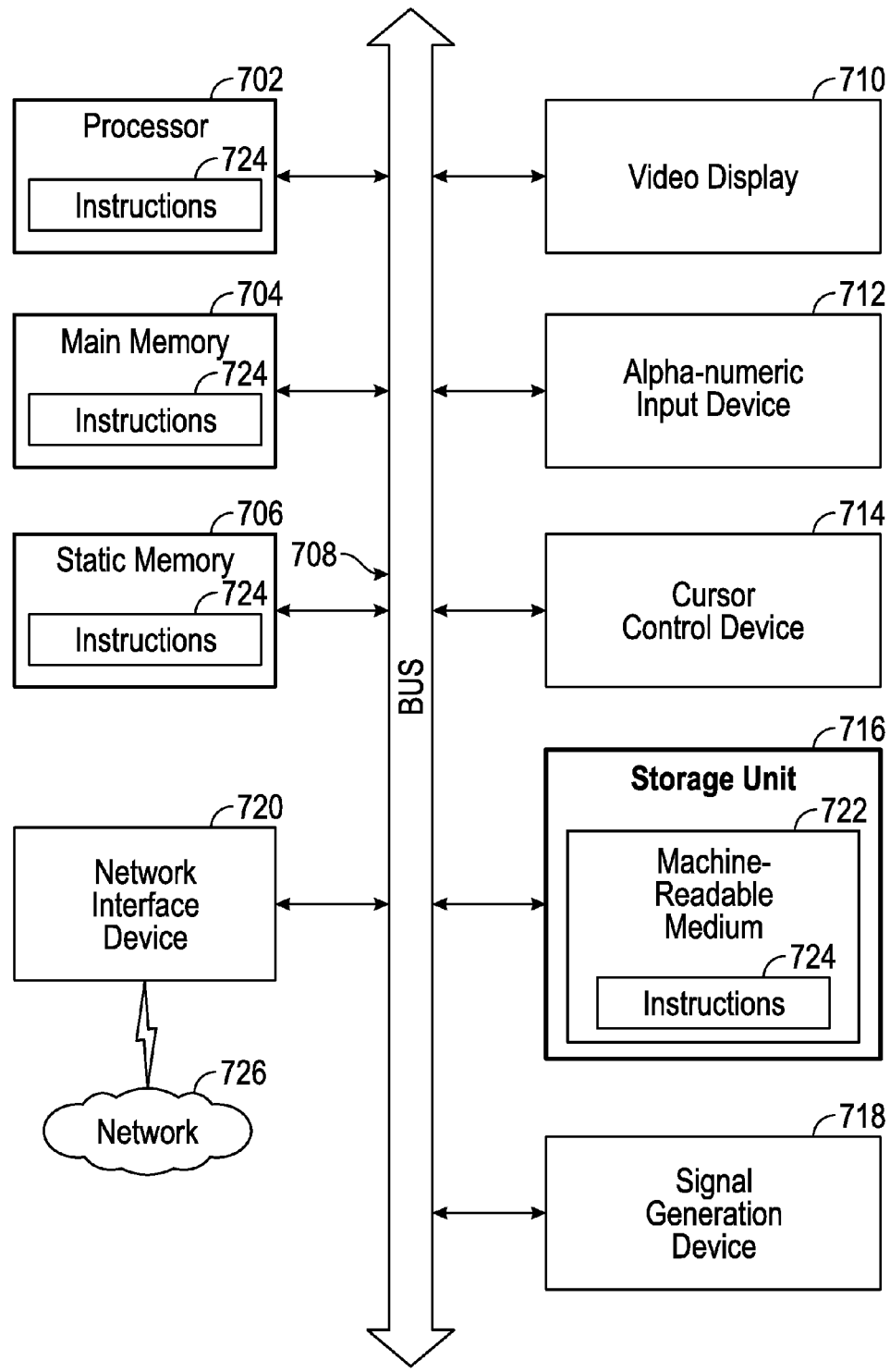
FIG. 7 illustrates a diagrammatic representation of a machine in the form of a computer system within which a set of instructions may be executed for causing the machine to perform any one or more of the methodologies discussed herein, according to an example embodiment.

With reference to FIG. 7, an example embodiment extends to a machine in the example form of a computer system 700 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment or n-tier network, as a peer machine in a peer-to-peer (or distributed) network environment or in a virtualized cloud computing environment. The machine may be a personal computer (PC), wearable computing device, a tablet PC, a set-top box (STB), a Personal Digital Assistant (PDA), a cellular telephone, a web appliance, a network router, a switch or bridge, sensor node, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 may include a processor 702 (e.g., a central processing unit (CPU), a graphics processing unit (GPU) or both), a main memory 704 and a static memory 706, which communicate with each other via a bus 708. The computer system 700 may further include a video display unit 710 (e.g., a liquid crystal display (LCD) or a cathode ray tube (CRT)). In example embodiments, the computer system 700 also includes one or more of an alpha-numeric input device 712 (e.g., a keyboard), a user interface (UI) navigation device or cursor control device 714 (e.g., a mouse), a storage unit 716, a signal generation device 718 (e.g., a speaker), and a network interface device 720.

The storage unit 716 includes a machine-readable storage medium 722 on which is stored one or more sets of instructions 724 and data structures (e.g., software instructions) embodying or used by any one or more of the methodologies or functions described herein. The instructions 724 may also reside, completely or at least partially, within the main memory 704 or within the processor 702 during execution thereof by the computer system 700, with the main memory 704 and the processor 702 also constituting machine-readable media.

While the machine-readable storage medium 722 is shown in an example embodiment to be a single medium, the term "machine-readable storage medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media. Specific examples of machine-readable storage media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 724 may further be transmitted or received over a communications network 726 using a transmission medium via the network interface device 720 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., Wi-Fi and WiMAX networks). The term "transmission medium" shall be taken to include any intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method for protecting unauthorized access to data, the data collected by sensor nodes within a sensor network and accessible to one or more applications by authorized customers through a service data platform, the service data platform in communication with the sensor network, comprising:
    generating a key-pair associated with an authorized customer including a public encryption key and a private decryption key;
    requesting certification of the public encryption key;
    receiving a certificate representing a certified public encryption key;
    distributing the certificate to the sensor nodes within the sensor network to enable the sensor nodes to encrypt the data at the sensor nodes with the certificate associated with the authorized user prior to being transmitted to the service data platform;
    splitting, using at least one processor of a machine, the private decryption key into multiple shares to decrypt the encrypted data when accessed by an application associated with the authorized customer;
    storing a first share of the multiple shares at the service data platform;
    storing a password encrypted second share of the multiple shares at the service data platform;
    transmitting a third share of the multiple shares to a third-party device for storage;
    in response to a request from the application associated with the authorized customer to access the encrypted data, receiving the encrypted data;
    determining that the private decryption key cannot be reconstructed using the combination of the first share and the password encrypted second share at the service data platform to decrypt the encrypted data;
    accessing the third party share from the third party device; and
    recovering, at the service data platform, the private decryption key using the third share and at least one of the first share and the password encrypted second share of the multiple shares.

2. The method of claim 1, further comprising:
    receiving a request associated with the authorized customer to generate the key-pair, the key-pair representing a customer key-pair.

3. The method of claim 1, wherein requesting certification of the public encryption key comprises:
    requesting a certificate authority to generate customer certificates associated with the key-pair.

4. The method of claim 1, further comprising:
    transmitting the second share to a customer device.

5. The method of claim 1, further comprising:
    destroying the private decryption key after splitting the private decryption key into multiple shares.

6. The method of claim 1, wherein the first share of the multiple shares is assigned to the service data platform, a second share of the multiple shares is assigned to the authorized customer, and the third share of the multiple shares is assigned to a third party.

7. The method of claim 6, wherein the third party represents a trusted third party.

8. The method of claim 6, wherein storing the password encrypted second-share at the service data platform further comprising:
   requesting a password from the authorized customer;
   in response to the request, receiving the password from the authorized customer;
   encrypting the second share of the multiple shares using the password from the authorized customer; and
   storing the password encrypted second share at the service data platform.

9. A system for protecting customer data collected at sensor nodes within a networked system, comprising:
   a memory device for storing instructions; and
   at least one processor of a machine, which, when executing the instructions, causes the system to perform operations comprising:
   generating a key-pair associated with a customer including a public encryption key and a private decryption key;
   requesting certification of the public encryption key;
   receiving a certificate representing a certified public encryption key;
   distributing the certificate to the sensor nodes within the sensor network to enable the sensor nodes to encrypt the data at the sensor nodes with the certificate associated with the authorized user prior to being transmitted to the service data platform;
   splitting the private decryption key into multiple shares to decrypt the encrypted data when accessed by an application associated with the authorized customer;
   storing a first share of the multiple shares at the service data platform;
   storing a password encrypted second share of the multiple shares at the service data platform;
   transmitting a third share of the multiple shares to a third-party device for storage;
   in response to a request from the application associated with the authorized customer to access the encrypted data, receiving the encrypted data;
   determining that the private decryption key cannot be reconstructed using the combination of the first share and the password encrypted second share at the service data platform to decrypt the encrypted data;
   accessing the third party share from the third party device; and
   recovering, at the service data platform, the private decryption key using the third share and at least one of the first share and the password encrypted second share of the multiple shares.

10. The system of claim 9, wherein the at least one process of the machine, which when executing the instructions, further causes the system to perform operations comprising:
    receiving a request associated with the authorized customer to generate the key-pair, the key-pair representing a customer key-pair.

11. The system of claim 9, wherein the operation of requesting certification of the public encryption key comprising:
    requesting a certificate authority to generate customer certificates associated with the key-pair.

12. The system of claim 9, wherein the at least one process of the machine, which when executing the instructions, further causes the system to perform operations comprising:
    transmitting the second share to a customer device.

13. The system of claim 9, wherein the at least one process of the machine, which when executing the instructions, further causes the system to perform operations comprising:
    destroying the private decryption key after splitting the private decryption key into multiple shares.

14. The system of claim 9, wherein the first share of the multiple shares is assigned to the service data platform, a second share of the multiple shares is assigned to the authorized customer, and the third share of the multiple shares is assigned to a third party.

15. The system of claim 14, wherein the third party represents a trusted third party.

16. The system of claim 14, wherein the operation of storing the password encrypted second-share of at the service data platform further comprising:
    requesting a password from the authorized customer;
    in response to the request, receiving the password from the authorized customer;
    encrypting the second share of the multiple shares using the password from the authorized customer; and
    storing the password encrypted second share at the service data platform.

* * * * *